(12) United States Patent
Mantelatto et al.

(10) Patent No.: US 8,617,315 B2
(45) Date of Patent: Dec. 31, 2013

(54) PROCESS FOR THE RECOVERY OF WATER AND ENERGY FROM THE PROCESSING OF SUGAR CANE IN SUGAR AND ETHANOL PRODUCTION MILLS

(75) Inventors: Paulo Eduardo Mantelatto, Piracicaba (BR); Celina Kiyomi Yamakawa, Campinas (BR); Antonio Rogério Perira César, Piracicaba (BR); José Luiz Olivério, Piracicaba (BR); Fernando Cesar Boscariol, Piracicaba (BR); Marcilio Nogueria do Amaral Gurgel, Campinas (BR)

(73) Assignee: Dedini S/A Industrias de Base, Piracicaba-SP (ES)

( * ) Notice: Subject to any disclaimer, the term of this patent is extended or adjusted under 35 U.S.C. 154(b) by 290 days.

(21) Appl. No.: 13/001,583

(22) PCT Filed: Jun. 24, 2009

(86) PCT No.: PCT/BR2009/000179
§ 371 (c)(1),
(2), (4) Date: May 13, 2011

(87) PCT Pub. No.: WO2009/155675
PCT Pub. Date: Dec. 30, 2009

(65) Prior Publication Data
US 2011/0232343 A1 Sep. 29, 2011

(30) Foreign Application Priority Data

Jun. 27, 2008 (BR) ........................ 0802631
Dec. 9, 2008 (BR) ........................ 0805706

(51) Int. Cl.
*C12G 3/12* (2006.01)

(52) U.S. Cl.
USPC .................. 127/43; 127/46.1; 127/56; 71/11

(58) Field of Classification Search
USPC .................................. 71/11; 127/43, 46.1, 56
See application file for complete search history.

(56) References Cited

U.S. PATENT DOCUMENTS 4,886,751 A 12/1989 Thorsson

FOREIGN PATENT DOCUMENTS

| WO | WO 97/33035 | 9/1997 |
| WO | WO 2006/125854 A1 | 11/2006 |
| WO | WO 2007/095706 A1 | 8/2007 |

OTHER PUBLICATIONS

The Written Opinion of the International Searching Authority for PCT/BR2009/000179, Oct. 13, 2010.*

(Continued)

*Primary Examiner* — David A Reifsnyder
(74) *Attorney, Agent, or Firm* — Douglas J. Christensen

(57) ABSTRACT

A process is proposed for recovery of water in the sugar cane processing in production mills of sugar and alcohol or only alcohol (ethanol). In the process, the thermal energy available in the exhausted steam from the electric energy generation turbines is transferred to the different mixed juice processing phases, with the reuse of the exhausted steam condensates in the boilers and of the other condensates, after using thermal energy, for imbibition, in the juice extraction phase, for cooling in the process, after passing through cooling towers, for other industrial uses and for possible treatment or use in the irrigation out of the productive system in the mill.

32 Claims, 12 Drawing Sheets

(56) References Cited

OTHER PUBLICATIONS

Ramjeawon, T., "Cleaner production in Mauritian cane-sugar factories," *Journal of Cleaner Production*, vol. 8, pp. 503-510 (2000).
Ingaramo, Alejandra, et al., "Water and wastewater eco-efficiency indicators for the sugar can industry," *Journal of Cleaner Production*, vol. 17, pp. 487-495 (2009).
Ravagnani, M.A.S.S., et al., "Improving Energetic Performance and Water Usage in an Industrial Ethanol Distillery," *Trans IChemE, Part B, Process Safety and Environmental Protection*, vol. 85(B6), pp. 526-532 (2007).
Cheng, H.T., "Environmental Protection in Taiwan Sugar Corporation," *Taiwan Sugar*, Taiwan Sugar Corp., vol. 43, No. 2, pp. 35-39 (Mar. 1, 1996).

* cited by examiner

PROCESS FOR THE RECOVERY OF WATER AND ENERGY FROM THE PROCESSING OF SUGAR CANE IN SUGAR AND ETHANOL PRODUCTION MILLS

PRIORITY CLAIM

The present application is a National Phase entry of PCT Application No. PCT/BR2009/000179, filed Jun. 24, 2009, which claims priority from Brazil Patent Application No. PI0802631-9, filed Jun. 27, 2008, and Brazil Patent Application No. PI0805706-0, the disclosures of which are hereby incorporated by reference herein in their entirety.

FIELD OF THE INVENTION

The present invention refers to a process for the recovery of water and by-products, such as organo-mineral fertilizers and others, resulting from the processing of sugar cane in sugar and ethanol production mills.

BACKGROUND OF THE INVENTION

Fresh water is the most precious asset and has been more and more scarce. It is not possible to imagine life without the presence of water. In the industrial society, the need for an intensive production of food has increasingly accelerated the consumption of water. Associated to water consumption, there are generated great volumes of effluents. The rational use of water has become an issue of fundamental importance to the humankind survival. The industry, on its turn, is a great consumer of water. By way of illustration, according to ABIQUIM—Brazilian Chemical Industry Association (Responsible Action Report 2006), water consumption in the beer industry is of about 15 to 25 L of water/one L of beer; for gasoline manufacture from 7 to 10 L of water/one L of gasoline; polyethylene about 231 L of water/one kg of polyethylene; paper pulp: 300 to 800 L of water/one kg of paper pulp; and fine paper: 900 to 1,000 L of water/one kg of fine paper. In the sugar and alcohol industry, water consumption has been reduced, as shown by the data in table 1. However, there is still a great potential to be used.

TABLE 1

Survey of capture, consumption and discharge of waters

| Uses ($m^3$/tc) | Year | | |
|---|---|---|---|
| | $1990^{(1)}$ | $1997^{(2)}$ | $2005^{(3)}$ |
| Capture | 5.6 | 5.07 | 1.83 |
| Consumption | 1.8 | 0.92 | not available |
| Discharge | 3.8 | 4.15 | not available |

$^{(1)}$PERH data (State Plan for Hydric Resources) 1994/95
$^{(2)}$CTC Survey, 34 mills of the State of São Paulo
$^{(3)}$UNICA/CTC Survey in 2005

As it will be demonstrated throughout this text, there is a wide potential for the sugar and alcohol industry to change the condition of water importer to water exporter and this is the main motivation of the invention proposed herein.

In order to have an idea of the production volumes involved in sugar and alcohol industry in Brazil, in the 2006/2007 harvest, according to DATAGRO (a private sugarcane consulting group in Brazil), there were processed, in 325 units in operation, 426,613,891 tons of sugar cane cultivated in an area of 5,340,000 hectares (8.8% of the agriculturable area in Brazil), yielding 17,850,646 $m^3$ of bioethanol and 30,606,677 tons of sugar. For production of these sugar and alcohol volumes, it was necessary the capture of about 767,905,004 $m^3$ of water and there were generated about 214,207,752 $m^3$ of vinasse and 17,064,556 tons of filter cake.

In order to better understand how to divide the water consumption and the generation of effluents along the sugar cane processing, a brief description of the sugar and ethanol manufacturing process is presented below.

The conventional process for producing sugar, alcohol and by-products (filter cake, boiler ashes, vinasse and carbonic gas and combustion gases) comprises the steps described ahead.

The sugar cane, which is manually or mechanically harvested in the plantation site, is sent to the industry where it is cleaned (via dry or wet process) and then submitted to a preparation process in which it is chopped and defibered, conveyed to extraction where it is fed into multi-stage (usually 4 to 6) countercurrent mills, where the sugar cane receives the addition of water in the last stage (imbibition), or in diffusers, (not very common in Brazil). This initial process generates the bagasse, which is sent to be burned in boilers (of medium or high-pressure) to generate steam and electric energy. The material resulting from the bagasse burning is defined by the ash and combustion gas. The extracted mixed juice is sent to the physical-chemical treatment to produce sugar and/or alcohol, depending whether the mill is a combined mill (producing sugar and alcohol), an autonomous distillery (producing solely alcohol) or a manufacturer of sugar and molasse (end syrup).

In the combined mills, generally about 50% of the processed sugar cane is destined to sugar manufacture and 50% to alcohol production.

The juice destined to the alcohol manufacture undergoes a specific physical-chemical treatment and is sent to the fermentation vats, jointly with the exhausted final run-off syrup (mother liquor) resulting from the sugar manufacture. This mixture, called must, undergoes an alcoholic fermentation process, in agitated tanks (fermenters or vats) using yeast (*Saccharomyces cerevisiae*), generating a typical fermented must containing from about 6% to 11% of ethanol. As a by-product of the fermentation process, it is further generated carbonic gas, in a mass amount of 1:1 in relation to the ethanol, and the fusel oil (less than 1% in mass) which is separated in a posterior distillation step. The resulting fermented must is then submitted to centrifugation, in which the yeast is separated and recycled, and the wine containing ethanol is sent to distillation. The wine is usually brought into direct contact with the steam in distillation columns, generating two streams, an ethanol stream at the top and a vinasse stream at the bottom. Due to the utilization of vapor in direct contact with the wine, there occurs the incorporation of condensate in the vinasse, and the volume generated can be somewhat between 10 and 14 times the volume of alcohol, depending on the wine alcoholic degree. In this case, the higher the alcoholic degree the lower the volume of vinasse formed and the lower the amount of vapor consumed by liter of ethanol produced. There also exists the distillation by indirect contact, in which the generated vinasse volume is smaller, since the heating vapor is not mixed with the vinasse. In this case, the generated vinasse volume is of about 6 to 8 times the alcohol volume and there is also the generation of a vapor condensate used in the heating. For the heating and distillation of the fermented wine, it is usually used the exhausted steam or the vegetal vapor produced in the pre-evaporation of the juice.

The mixed juice destined to the sugar manufacture undergoes an operation of separating the bagacillo in cush-cush type screen (and/or rotary screens), is heated to about 40° C. and, depending on the type of sugar produced, is conveyed to sulfitation (usually in columns or hydro-ejectors) in which, by addition of sulphur dioxide resulting from the sulphur burning in the burners, has its pH reduced to about 4.0 to 4.5. The sulfitation is usually used when the sugar produced is the white crystal sugar. For the production of the raw sugar (VHP, VVHP, Demerara types), the juice is not submitted to the sulfitation process.

After sulfitation, the juice receives the addition of lime milk (or calcium saccharate), in which the pH is elevated to about 7.0 to 7.2. The limed (or dosed) juice is then heated to about 105° C. For heating the mixed juice, there are usually used vegetal vapors from the bleeding of the juice evaporation, of the first (V1), second (V2) and third stage (V3) of evaporation. The temperature of the vapor is V1>V2>V3. The temperature of these vapors ranges according to the number of juice evaporation stages. Then, the juice undergoes a vaporization process (flash balloon) for removal of dissolved gases, receiving the addition of a flocculating agent (usually a polyacrylamide polyelectrolyte) and is then submitted to the decantation in static decanters (with or without trays). This operation is also commonly known as clarification.

The clarification process generates two streams: a sludge stream, containing the impurities removed from the juice and a residual amount of sugar, and a clarified juice stream, containing most part of the sugar to be processed. The sludge, after being added with bagacillo separated in the belt of bagasse effluent from the extraction (a type of "natural filtrating means"), receives the addition of lime milk and, eventually, polyelectrolyte, and is then filtrated in vacuum rotary filters or belt press filters, thus producing the filter cake which is conveyed to the plantation site, as well as the filtrated juice, which contains most of the sugars recovered from the sludge and is reconducted to the process in the juice treatment section.

The thus obtained clarified juice is sent to the evaporation in multiple effect vacuum evaporators (usually Robert type evaporators with 4 or 5 stages), yielding, after the last evaporation stage, a concentrated juice known as syrup, with a concentration of about 65° Brix. The system operates receiving an exhausted steam in the first stage, which, in an indirect contact with the juice, generates a vegetal vapor, which is sent to the second stage, in which it heats an evaporation surface, evaporating the juice coming from the first stage and generating the vegetal vapor. This operation is repeated until the last evaporation stage in which the line of vegetal vapor is connected to a barometric condenser in direct contact with cold water (coming from a cooling system: towers, sprays, etc.). The concentrated juice effluent from this late stage is known as syrup. A common practice for thermal energy economy is to effect the bleeding of part of the vapors produced in the first (V1), in the second (V2) and in the third (V3) evaporation stages. These vapors are used in the posterior operations of evaporation and crystallization (cooking), heating of the mixed juice and distillation in the alcohol manufacture.

The syrup obtained in the evaporation is sent to the posterior concentration and crystallization step, which is carried out in vacuum calender type evaporating crystallizers in systems of two or three masses.

Generally, the conventional crystallization process in the batch system takes from 3 to 5 hours, and the crystal mass thus obtained is conveyed to horizontal crystallizers provided with a cooling jacket until reaching the ambient temperature. In this step, the juice is concentrated until the crystallization point of the sucrose and the vapor used, in an indirect contact with the syrup is the vapor V1 and/or V2. The vapor effluent from the syrup concentration is usually carried out in barometric condensers in which cold water is in direct contact with said vegetal vapor. In the evaporation and crystallization operation, it can also be used a continuous equipment, commonly employed for the masses B and C.

The crystallized mass thus produced is then submitted to a centrifugation cycle, in basket centrifuges, in which the crystals are washed upon application of water and steam and then conducted to the drying and bagging steps. The run-off syrup obtained in the centrifugation is reused in the cookings for obtaining the second sugar (sugar B or magma) and, eventually, the third sugar (sugar C or magma), which are also re-circulated in the first-sugar manufacturing process. The end syrup (molasse) originated in mass B in systems with two masses, or originated in mass C (system with three masses) is conveyed to alcohol manufacture, jointly with part of the juice separated for the production of alcohol. For centrifuging intermediate masses (B and C) continuous centrifuges are used.

It should be further emphasized that, in the mills which produce only ethanol, the steps of extraction, steam and energy generation, decantation juice treatment, distillation, alcohol dehydration are identical to those previously described regarding the combined mill. The basic difference is that the juice evaporation occurs in a single evaporation stage and the vapor generated (V1) is generally used for distillating the fermented wine. The juice pre-evaporated until about 22% to 25% of solids is fully used for the preparation of the must to be fermented.

In the case of mills which produce only sugar, it is used the same sugar manufacture process of the combined mill. The commonly produced end syrup or molasse is sold to mills which produce ethanol and to other industrial purposes as well.

For carrying out the unitary sugar cane operations previously described until obtaining the sugar and the ethanol, it should be basically eliminated almost the whole water coming from the raw material (sugar cane) and which represents about 70% of the total. This water is removed along the steps of juice evaporation, concentration and crystallization of the syrup sugar, sugar drying, ethanol distillation and dehydration.

Finally, it should be further emphasized that a practice that has been increased in the sugar and alcohol industry is the harvest of the whole sugar cane (stems and straw), that is, with part of the straw (fine straw) constituent thereof. Part of this straw remains in the field and the straw carried with the sugar cane (stems) is separated in the industry and sent to the boilers for generation of steam and, posteriorly, energy for consumption of the sugar and alcohol industry complex itself, as well as for exportation to the public electrical network. This practice has been increasingly adopted as the sugar cane burning is being gradually eliminated, with the mechanization of the crop process and the resource availability (investment) of the public sector for the construction of energy co-generation units. Thus, there is a real possibility of increasing the profitability of the agroindustrial complex, of reducing the particulate emission and substituting non-renewable energy sources.

Water is also used in the process as a fluid for: cleaning, condensation, dilution, solvent, heating, cooling, generation of vapor, extraction of sucrose from the sugar cane, control of particulate material emission, consumption and the like.

The sugar cane circuits of washing, vacuum formation and fermentation cooling are usually closed circuits. But the total hydric circuit is not closed, as the treatment of the residual waters and of the vinasse is hardly carried out and thus there are losses that make the water capture necessary. The residual waters and the vinasse are discharged on the plantation site in a fertirrigation system.

The main uses of the water and the average value are presented in Table 2 (ELIA NETO, A.: "Workshop about the charging for water use"—Convention AIAA Hydrographic Basin Committee of the Piracicaba, Capivari and Jundiai Rivers (CBD-PCJ), Piracicaba, 1996), in the case of mill with production mix of 50% of sugar and 50% of ethanol. The estimated average use of water, according to Table 2, is of 21.00 m3/sugar cane ton.

This value corresponds to much lower levels of capture, consumption and discharge of water, by reusing the water. This consumption may be summarized in three great categories: process, 29.8%; cooling, 40.2% and vacuum, 30%.

It is observed that only by eliminating the sugar cane washing it is possible to reduce about 50% of the water capture. This operation requires a high water volume and an equally high consumption, since it needs constant effluent purges with high BOD load, which requires a higher amount of make up water. These numbers indicate the perspectives for the sugar and alcohol industry as to the reduction of water consumption. Although the sugar and alcohol industry has been implementing measures for reducing water capture and waste disposal, as pointed out by ELIA NETO in his study carried out for the State of sao Paulo (ELIA NETO, A.: "Workshop about the charging for water use"—Convention AIAA Hydrographic Basin Committee of the Piracicaba, Capivari and Jundiai Rivers (CBD-PCJ), Piracicaba, 1996), it is observed that the consumption in said sugar and alcohol industry is much higher than that observed in other industries. In 2006, the chemical industry captured an average of 7.25 $m^3$ of water/manufactured product ton (ABIQUIM—Brazilian Chemical Industry Association, 2006), whilst for production of only ethanol, considering the productivity of 84 ethanol liter/sugar cane ton, the capture of 1.83 $m^3$/sugar cane ton (UNICA—Union of Sugar Cane Agribusiness of Sao Paulo, 2005), it would be consumed 28 $m^3$ of water/produced ethanol ton, which indicates a consumption approximately four times higher than the average of the chemical industry.

Table 2 below presents the average values of the water uses in sugar and ethanol mills (CTC—Sugar Cane Technology Center, 1995).

| Sector | Use | Average use ($m^3$/tc) | Classification |
| --- | --- | --- | --- |
| Sugar cane reception | Sugar cane washing | 5.33 | Process |
| Extraction (Mills) | Imbibition | 0.25 | Process |
| | Bearing Cooling | 0.15 | Cooling |
| Juice treatment | Lime Milk preparation | 0.01 | Process |
| | Cooling in the sulfitation | 0.05 | Cooling |
| | Imbibition of the filters | 0.04 | Process |
| | Condensers of the filters | 0.30 | Vacuum |
| Juice concentration | Condensers/multi-jets evaporation | 2.00 | Vacuum |
| | Condensers/multi-jets cookers | 4.00 | Vacuum |
| | Dilution of run-off syrups | 0.03 | Process |
| | Crystallizer cooling | 0.05 | Cooling |
| | Sugar cane washing | 0.01 | Process |
| Energy generation | Production of vapor | 0.50 | Process |
| | Cooling of the turbogenerators | 0.20 | Cooling |

-continued

| Sector | Use | Average use ($m^3$/tc) | Classification |
| --- | --- | --- | --- |
| Fermentation | Juice Cooling | 1.00 | Cooling |
| | Cooling of the fermenters | 3.00 | Cooling |
| Distillery | Cooling of the condensers | 4.00 | Cooling |
| Others | Cleaning of floors and equipment | 0.05 | Process |
| | Potable use | 0.03 | Process |
| Total | | 21.00 | |

Besides the environmental issues, high water consumption and the generation of effluents may, in a near future, impair the profitability of the business, since there are indications that, in Brazil, the capture and use of water will be charged. In 2007, the State of São Paulo started to charge the users of hydric resources relative to the volumes of capture, consumption and discharge of effluents with organic load. This charge occurs by act of State law 12183/05, ruled by State Decree no 50667/06. The charge is made decentralizedly for each of the 21 Hydrographic Basin Committees of the State of São Paulo, since they have a better knowledge of the hydric resource conditions (availability, quality, capture, etc.) of each region of the State. Nowadays, the charging is limited to R$ 0.01 (US$ 0.0050) by captured cubic meters; R$ 0.02 (US$ 0.01) by consumed cubic meter; and the triple of the sum of the two first for each cubic meter of effluent discharged back in the water bodies. There is no doubt that the attribution of an economic value to the water will naturally cause the induction to reduce the water capture and consumption and better use thereof.

Several studies demonstrate that the water contained in the sugar cane is more than sufficient for the industrial processing thereof, since, by recycling and reuse, the external water consumption can be minimized (HSIEH, W. D., H. K. SHEEN and C. H. CHEN—1995—"An approach to zero effluent in cane sugar factories", Proceeding of the Congress of the International Society of Sugar Cane Technologists—September 1995, Cartagena). LIMA et al. emphasize in their book (LIMA, U. DE A.; AQUARONE, E.; BORZANI W. E SCHMIDELL; W. et al.—2001) that a ground sugar cane ton produces, on average, 850 liters of juice, from which 78%-86% is water, 10% to 20% is sucrose, 0.1% to 2% is reductor sugar, 0.3% to 0.5% is ash and, between 0.5 and 1.0% are nitrogenated compounds (LIMA, U. DE A.; AQUARONE, E.; BORZANI, W. E SCHMIDELL, W. et al.—2001). Industrial Biotechnology, Fermentation and Enzymatic Processes—Vol 3—Editora Edgard Blucher Ltda, Brazil. RIBEIRO (RIBEIRO, W. M. S.—1995. 3° Seminar of the Dearborn Company for the sugar and alcohol industry, 1995, Ribeirão Preto—SP, 1995) points out that the recycle and reuse of the water in the productive process can be economically feasible, as long as the implementation of these processes can provide, to the company, reduction of cost with effluent treatment and sludge disposition; reduction of cost with captured water (in case of charging); decrease in effluent monitoring level and frequency; adequate environmental management of the hydric resources and effluents, preventing penalties from inspection organisms. According to the same author, the implementation of the water reuse and recycle processes basically follows steps, such as: fully auditting the production unit, surveying data and systematizing the hydric balance; identifying the streams of higher and lower impact, mainly regarding flow rates and potential polluters; selecting alternative treatment processes for the cases in which reuse is not applicable and in which it is necessary the previous conditioning for reuse in the process; identifying the reapplication of the water, characterizing reuse or recycle; carrying out tests in plant and simulation to evaluate the technical feasibility of the alternative implementation; evaluating tests, simulating and implementing. KESSERLINGH, S. M (MINIMIZATION AND REUSE OF WATERS IN SUGAR AND ALCOHOL INDUSTRIES: CASE STUDY, Master's Degree dissertation, Escola de Engenharia de São Carlos (Engineering School), Universidade de São Paulo (Sao Paulo State University), 2002) describes in details the issue regarding high water consumption in the sugar and alcohol industries and the consequent generation of liquid effluents which cause impacts the environment. In this study, it is presented an extense bibliographic revision of the prior art in relation to the use of the water in the sugar and alcohol industry, as well as projects for the zero-effluent program.

SUMMARY OF THE INVENTION

As a function of the prior art limitations, the invention has as object to provide a process for the recovery of water and energy from sugar cane in sugar or alcohol (ethanol) production mills. The process object of this invention comprises, in one of the ways of carrying out the invention, in the case of sugar and alcohol (ethanol) production mills, the steps of: (a) submitting the sugar cane to a juice extraction operation with imbibition by condensates recovered from vegetal vapor; (b) treating and purifying the extracted juice, using vegetal vapor condensate, evaporation vegetal vapor and inputs, and producing a clarified juice flow, a sludge flow and a vegetal vapor condensate flow; (c) treating the sludge flow, producing a filter cake and a recovered juice flow which is returned to the step of treating and purifying the juice; (d) submitting part of the clarified juice flow to a multiple effect vacuum evaporation unit, under heating by exhausted steam from the energy generation unit, producing: an exhausted steam condensate, to be at least in part returned to the energy generation unit; at least one evaporation vegetal vapor flow; a last effect vegetal vapor flow; a vegetal vapor condensate flow; and a syrup flow; (e) concentrating the syrup until the crystallization point of part of the sucrose contained therein, under heating with at least part of the vegetal vapor flow produced in the evaporation unit, producing a crystallization vegetal vapor flow, a vegetal vapor condensate flow and a crystallized product flow (crystallized mass); (f) centrifuging the crystallized product, producing an end syrup (molasse) flow and a sugar flow to be dried and bagged; (g) mixing the remaining clarified juice flow with the molasse flow in proportions adequate to the fermentation, and cooling the resulting must by indirect thermal exchange, with at least one of the means defined by an extracted mixed juice flow and a water flow of vegetal vapor condensate, at the wet-bulb temperature corresponding to the ambient temperature, circulating through a cooling tower unit; (h) maintaining the fermentation temperature between 25° C. and 36° C., preferably between 30° C. and 32° C., by indirect thermal exchange with a water flow of vegetal vapor condensate circulating through a cooling tower unit; (i) fermenting the cooled must, producing a wine flow, and distillating the wine to produce ethanol and vinasse.

According to the Invention:
the extracted juice (mixed juice) is pre-heated in the cooling of the must and heated by regenerative indirect thermal exchange with at least one of the flows defined by the last effect vegetal vapor of the evaporation unit and by the crystallization vegetal vapor, transforming said vapor flows in vegetal vapor condensate flows;

the step of distillating the wine is carried out with the indirect heating of the wine by at least one of the means defined: by part of the evaporation vegetal vapor flow; by part of the exhausted steam flow; and by a vinasse vegetal vapor flow, producing an alcoholic vapor flow and at least one of the flows defined by vegetal vapor condensate and exhausted steam;

the alcoholic vapor flow is condensed by indirect thermal exchange with at least one of the flows defined by fermented wine and vegetal vapor condensate water of the cooling tower unit;

the vinasse is submitted to a multiple effect vinasse evaporation unit, under heating by evaporation vegetal vapor, producing: at least one vinasse vegetal vapor flow, a last effect vinasse vegetal vapor flow, a vegetal vapor condensate flow, and a concentrated vinasse flow;

the wine, to be distillated, is pre-heated by indirect thermal exchange with at least one of the means defined by the last effect vinasse vegetal vapor flow and by an alcoholic vapor flow from a distillation stage, producing a vegetal vapor condensate flow and an alcoholic condensate flow;

the excess of the vegetal vapor condensate flows, which is not used in the process, is sent, at least in part, to the cooling tower unit and, if it is still available, stored for posterior treatment.

In another way of carrying out the invention, in the case of an ethanol production mill, the process comprises the steps of: (a) submitting the sugar cane to a juice extraction operation with imbibition by vegetal vapor condensate; (b) treating and purifying the extracted juice, using vegetal vapor condensate, pre-evaporation vegetal vapor and inputs, and producing a clarified juice flow, a sludge flow and a vegetal vapor condensate flow; (c) treating the sludge flow, producing a filter cake and a recovered juice flow which is returned to the step of treating and purifying the juice; (d) submitting the clarified juice flow to a pre-evaporation unit, under heating by exhausted steam from the energy generation unit, producing: an exhausted steam condensate, to be at least in part returned to the energy generation unit; a evaporation vegetal vapor flow; and a pre-evaporated juice flow; (e) cooling the pre-evaporated juice by indirect thermal exchange with at least one of the means defined by a flow of part of the extracted juice (mixed juice) and a vegetal vapor condensate flow circulating by a cooling tower unit; (f) fermenting the cooled must constituted by pre-evaporated juice, producing a wine flow, and distillating the wine to produce ethanol and vinasse.

According to the Invention:
the extracted juice (mixed juice) is heated by indirect thermal exchange, before its physical-chemical treatment, with at least one of the means defined by a pre-evaporated juice flow and vegetal vapor condensate flows recovered in the process;

the extracted juice, submitted to the physical-chemical treatment, is heated to about 105° C. to 110° C., by indirect thermal exchange with the pre-evaporation vegetal vapor flow, transforming the latter in a vegetal vapor condensate flow;

the step of distillating the wine is carried out with the indirect heating of the wine by at least one of the means defined: by part of the pre-evaporation vegetal vapor flow, by part of the exhausted steam flow; and by a vinasse vegetal vapor flow, producing an alcoholic vapor flow and at least one of the flows defined by vegetal vapor condensate and exhausted steam;

the alcoholic vapor flow is cooled by indirect thermal exchange with at least one of the flows defined by fermented wine and vegetal vapor condensate water of the cooling tower unit;

the vinasse is submitted to a multiple effect vacuum vinasse evaporation unit, under heating by pre-evaporation vegetal vapor, producing: a vinasse vegetal vapor flow, a last effect vinasse vegetal vapor flow; a vegetal vapor condensate flow, and a concentrated vinasse flow;

the wine, to be distillated, is pre-heated by indirect thermal exchange with at least one part of the flows defined by an alcoholic vapor flow from a distillation stage and by a last effect vinasse vegetal vapor flow, producing an alcoholic vapor condensate flow and a vinasse vegetal vapor condensate flow;

the excess of the vegetal vapor condensate flows, which is not used in the process, is sent, at least in part, to the cooling tower unit and, if it is still available, stored for posterior treatment.

In another way of carrying out the invention, in the case of a sugar production mill, the process comprises the steps of: (a) submitting the sugar cane to a juice extraction operation with imbibition by vegetal vapor condensate; (b) treating and purifying the extracted juice, using vegetal vapor condensate, evaporation vegetal vapor and inputs, and producing a clarified juice flow, a sludge flow and a vegetal vapor condensate flow; (c) treating the sludge flow, producing a filter cake and a recovered juice flow which is returned to the step of treating and purifying the juice; (d) submitting part of the clarified juice flow to a multiple effect vacuum evaporation unit, under heating by exhausted steam from the energy generation unit, producing: an exhausted steam condensate, to be returned to the energy generation unit, at least one evaporation vegetal vapor flow; a last effect vegetal vapor flow, a vegetal vapor condensate flow; and a syrup flow; (e) concentrating the syrup until the crystallization point of part of the sucrose contained therein, under heating with at least part of the vegetal vapor flow produced in the evaporation unit, producing a crystallization vegetal vapor flow, a vegetal vapor condensate flow and a crystallized product flow (crystallized mass); (f) centrifuging the crystallized product, producing an end syrup (molasse) flow and a sugar flow to be dried and bagged.

According to the Invention:

the extracted juice (mixed juice) is heated, at least in part, by indirect thermal exchange with at least one of the flows defined by the last effect vegetal vapor of the evaporation unit and by the vegetal vapor of the step of concentrating the syrup for crystallization, transforming said vapor flows in vegetal vapor condensate flows;

the excess of the vegetal vapor condensate flows, which is not used in the process, is sent, at least in part, to the cooling tower unit and, if it is still available, stored for posterior treatment.

Thus, the industries related to sugar and alcohol production change their condition of water importers to become water exporters, generating their own energy from a renewable source and exporting it for irrigation and/or public network. Moreover, they transform the solid residues generated in the manufacture of sugar (filter cake) and ethanol (filter cake and vinasse) and in the boilers (ashes and chimney gas for heating) into a granulated solid organo-mineral fertilizer. This results in: a lower fossil fuel consumption, environment preservation, economic savings with water capture and waste disposition, reduction of transport fleet and equipment used for transportation and distribution of vinasse, ashes and cake, economy in fertilizer purchase by re-circulating the solid rejects rich in nutrients (mainly potassium), a lower operational cost and possibly, in the future, water export to the public network. The final result is profitability improvement of the sugar and alcohol energetic industry complex in a sustainable manner.

BRIEF DESCRIPTION OF THE DRAWINGS

The invention will be described below, with reference to the enclosed drawings, given by way of example of possible ways of carrying out the invention and in which.

DESCRIPTION OF THE INVENTION

Sugar and Ethanol Production

Figure 1:
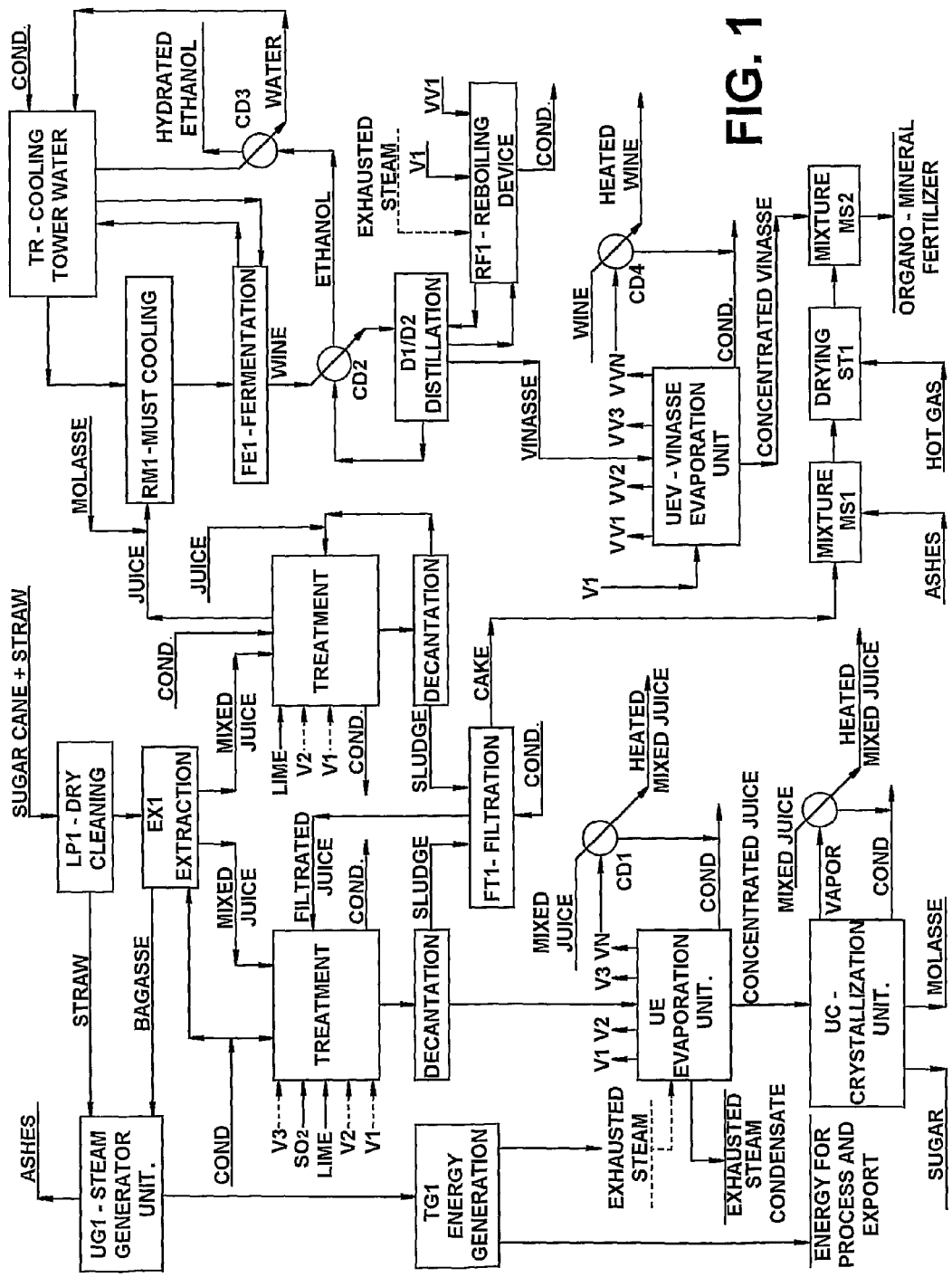
FIG. 1 represents a simplified flowchart of the process of the invention when applied in the sugar and alcohol production.
Figure 1A:
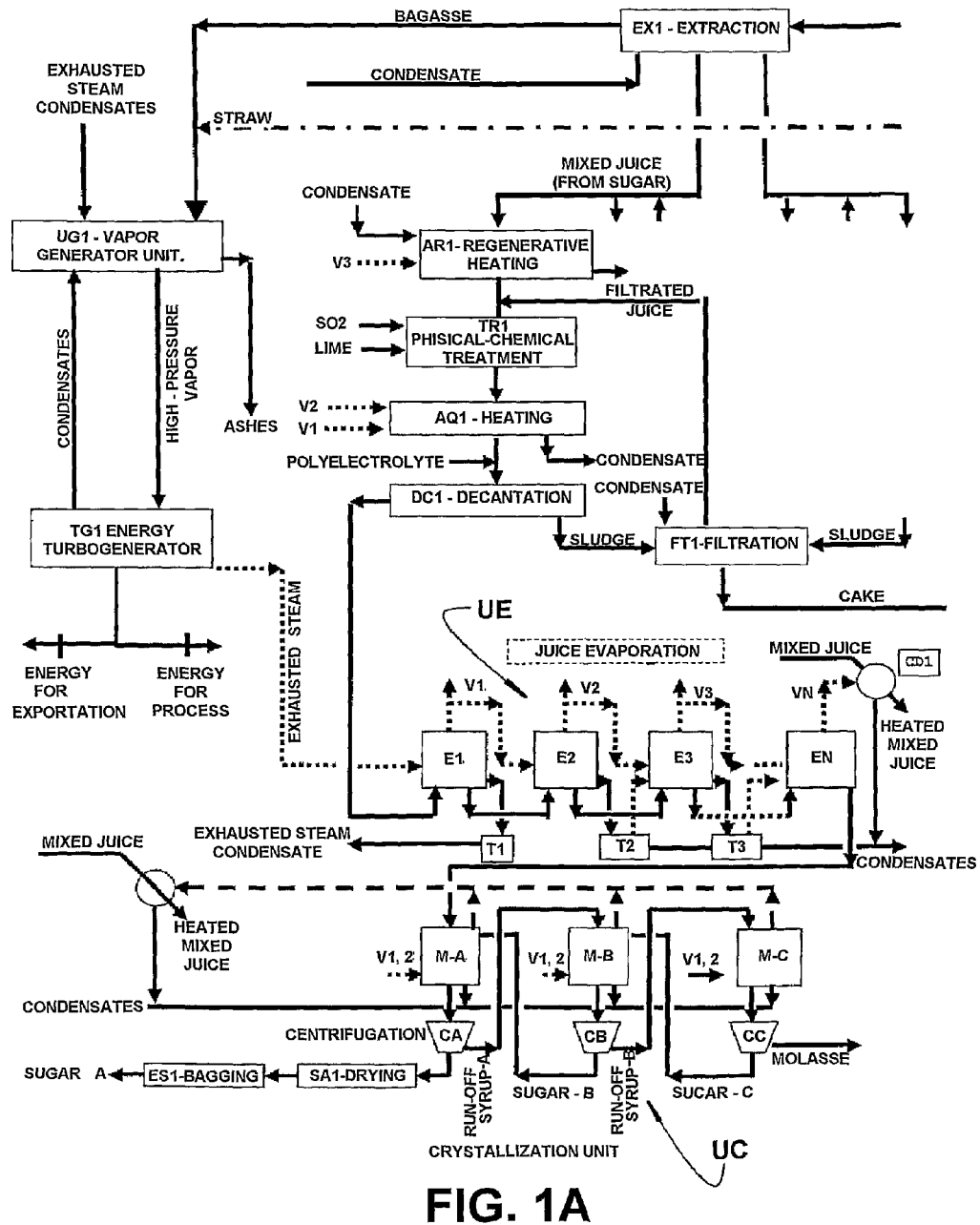
FIGS. 1A and 1B together represent the flowchart of FIG. 1 in greater details, FIG. 1A referring to the sugar production steps and FIG. 1B referring to the alcohol production steps.
Figure 1B:
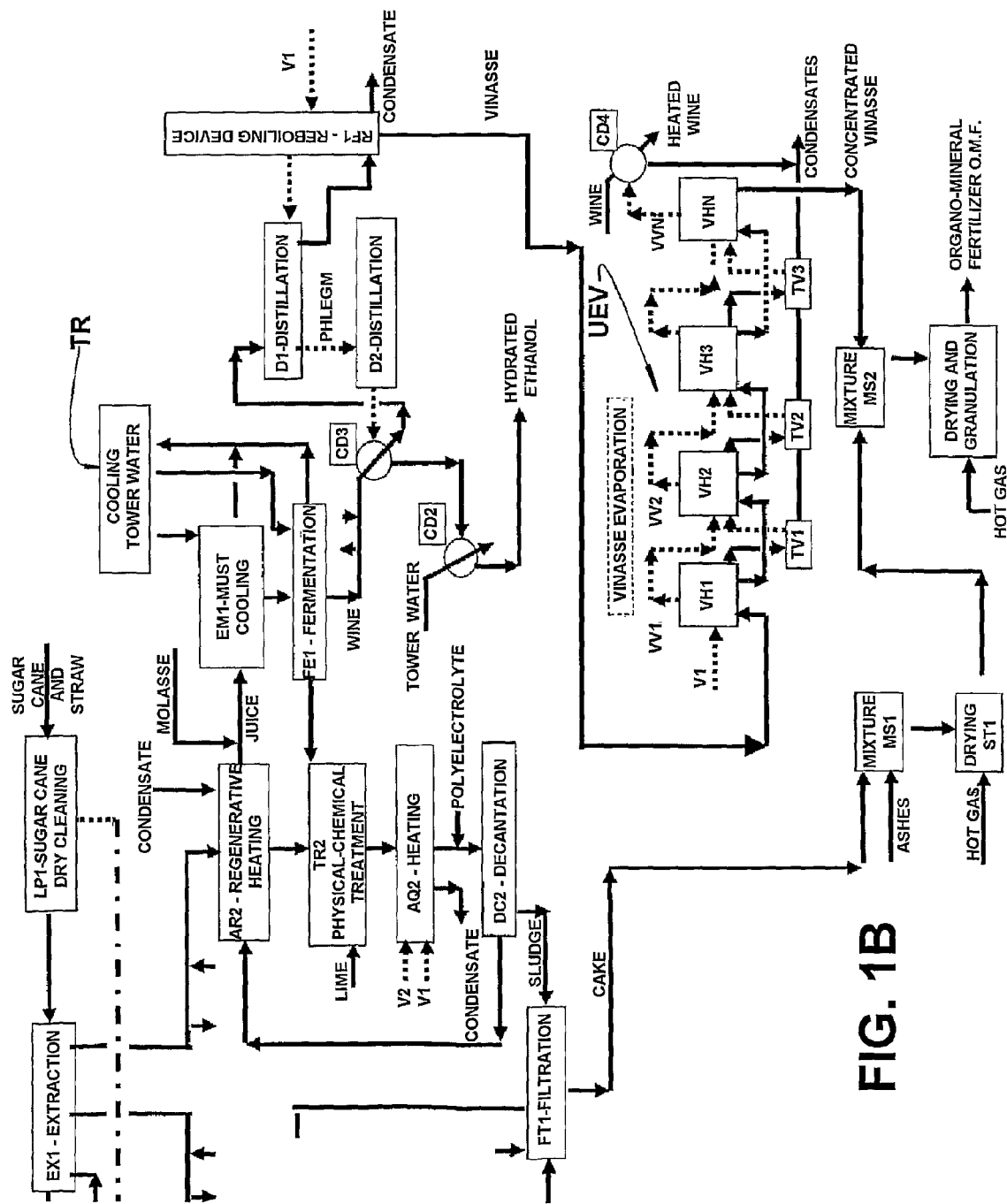

In the integrated production process of sugar and ethanol, energy, organo-mineral fertilizer and recovery of water (see FIGS. 1, 1A and 1B), the sugar cane and the straw are brought from the plantation site and introduced in the manufacturing process. The straw can be brought separately or jointly with the sugar cane, preferably jointly with the sugarcane, and separated therefrom at the beginning of the process. The sugarcane, on its turn, is submitted to cleaning in the dry cleaning system LP1 and follows to the extraction step in EX1, in which it is submitted to the adequate preparation to be then submitted to the juice extraction process. In the extraction process, the sugarcane is added with condensates recovered from the manufacturing process. This operation is called imbibition. In this step, the bagasse and the mixed juice are generated. The bagasse, containing about 50% of moisture, is sent jointly with the straw to be burned in the high-pressure steam generator unit UG1. The high-pressure vapor, generated in this unit, is conveyed to an energy turbogenerator unit TG1, in which electric energy is produced for the manufacturing process and also for exportation of the excess to the public electrical network. In this step, it is also generated exhausted steam to be used in the process of manufacturing sugar, ethanol and organo-mineral fertilizer (exhausted steam at about 127-130° C. and at about 2.5 kgf/cm2 of absolute pressure) and condensates of this vapor which return to the generator unit UG1. The mixed juice is divided into two streams adequately separated in the extraction process in EX1. About 50% of the mixed juice is sent to the sugar manufacture (FIG. 1A) and the remainder to the ethanol manufacture (FIG. 1B). The fraction destined to the sugar manufacture is heated in an indirect regenerative heating device AR1 in which it exchanges heat with part of vegetal vapor condensates recovered from the process and, subsequently, with a vapor V3, obtained in an evaporator E3 of an evaporation unit UE to be commented ahead. The mixed juice, effluent from this heating system, must have a temperature between 40° C. and 50° C. and will subsequently undergo a sulfitation process until reaching a pH of about 4.0-4.8 (in case white crystal sugar is produced) and a liming process until a pH of about 6.8-7.5 in a treatment unit TR1. The treated juice is then heated, by indirect contact, in a heating unit AQ1, with vapor V2 coming from a second juice evaporator E2, to be commented ahead and, subsequently, it is heated with vapor V1 originating from the first evaporator E1. The juice thus heated must be at a temperature between 105° C. and 110° C., passes through a flash balloon, in order to eliminate dissolved gases, receives the addition of a flocculating agent (polyelectrolyte—usually a polyacrylamide) and follows to a decantation unit DC1. In this step, most juice impurities (non-sugars) are removed, generating a stream called sludge, which contains the removed non-sugars (proteins, amino acids, chlorophyll, anthocyanin, mineral impurities, colored compounds, bagacillos and the like) and part of the sugar carried by said stream (contained in the juice which surrounds the sludge), and another stream which is the purified juice, called clarified juice.

The clarified juice is then conveyed to a juice evaporation unit UE, generally formed by a plurality of evaporators E1, E2, . . . EN, defining multiple cascade effects. The clarified juice is fed into the first indirect contact evaporator E1, in which it exchanges heat with the exhausted steam produced in the turbogenerator unit TG1. In this step, part of the water contained in the juice is evaporated, thus generating a vegetal vapor V1 stream. This vapor is fed into the second evaporator E2, in which it exchanges heat with the partially concentrated juice effluent from the first evaporator E1. Thus, vapor V2 is generated, which is conveyed to the third evaporator E3, in which, through the indirect contact with the juice effluent from the second evaporator E2, vapor V3 is generated. The same occurs successively until reaching the last evaporator En. In the last evaporator En, under a vacuum of about 25 inches of HG°, it is generated a final vapor Vn which, through an indirect contact device, exchanges heat with the mixed juice and is then condensed in a first condenser CD1. The heated mixed juice (an adequate fraction of the total, which is sufficient for condensation of said vapor) is sent to the step in which the regenerative heating AR1 occurs. The condensate generated in the first evaporator E1 is collected in a first compartment T1 and returns to the steam generator unit UG1. The condensate generated in the second evaporator E2 passes through a second compartment T2, in which it is partially transformed in vapor, by the pressure difference between the evaporators, returning to the third evaporator E3. The liquid part effluent from the second compartment T2 is conveyed to a third compartment T3, in which it undergoes again a partial vaporization process, being conveyed to the fourth evaporator E4. The liquid part follows to the next compartment, and the process is repeated until reaching the last evaporator En. The condensates coming from the second evaporator E2 to the last evaporator En and from the first condenser CD1 are mixed and sent to be used in the process.

In this step, the adequate number of evaporative effects is from 4 to 6, preferably 5. The condensate recovered in the first evaporative effect must not be mixed with the other condensates, but sent directly to supply water to the boiler, after passing through a softening process and, preferably, reverse osmosis for elimination of ions. For a good thermal use, the condensate generated in the second evaporator E2 must circulate to the third evaporator E3 and, from these, to the subsequent evaporator, and so on until the last evaporator En, thereby recovering part of the thermal potential contained in the condensates (economy of about 5%).

The concentrated juice effluent from the evaporation unit UE, called syrup, at a concentration of about 60-65° Brix is conveyed to a sugar crystallization unit UC.

The sugar crystallization unit UC can comprise two masses, A and B, or three masses, A, B and C. FIG. 1A illustrates a crystallization unit UC of three masses. The previously obtained syrup is fed into the cooker (evaporating crystallizer) M-A, which received sugar B after an adequate concentration of syrup (seeding point), being adequately evaporated and crystallized until sugar crystals reach an adequate size. The crystallized material, containing about 50%-55% of sugar crystals and called mass A, is fed into a centrifugation device CA in which the crystals are separated from the final run-off syrup A (mother liquor). The crystals are washed with addition of condensate and vapor V1 for removal of the residual run-off syrup remaining from the initial centrifugation, generating the wet sugar A. The run-off syrup A is sent to the cooking B jointly with the sugar C (magma) which is added after the run-off syrup A reaches the seeding point. Identically to mass A, the run-off syrup A is evaporated and adequately crystallized in the crystallizer M-B, generating the mass B rich in crystals, which is centrifuged, washed with condensate and vapor in the centrifugation device CB, generating the sugar B which is adequately fed as a crystallization seed (seeding) of the mass A. Mass C is obtained by evaporation of the run-off syrup B which is adequately crystallized by addition of a crystallization germ in the crystallizer M-C, generating the mass C rich in crystals, which is centrifuged, washed with condensate and vapor in the centrifugation device CB, generating the sugar C (magma C) which is fed as a crystallization seed of the mass B. The separated end syrup C (molasse) is sent to form the must jointly with the other fraction of juice separated for the ethanol fermentation and production. Sugar A is sent to the drying section SA1 and, subsequently, to the bagging section ES1.

In the vacuum cookers which are supplied with syrup and run-off syrups, the heating and the evaporation are effected through the admission of vapor V1 or V2 or V3, preferably V2 or V3, the condensation of the vapor resulting from the evaporation of the syrup and run-off syrups being effected through an indirect thermal exchange device, in which the cold fluid can be the mixed juice or wine (in the case of combined mills) in substitution to the direct contact condensation system, in barometric condensers which use water in a proportion of about 35-37 times the vapor mass.

The fraction of mixed juice separated for the ethanol production undergoes heating in at least two steps in a respective regenerative heating device AR2, in which it is heated in indirect contact device, exchanging heat with the generated clarified juice and, posteriorly, in the heating unit AQ2. The effluent mixed juice is heated in the first step until about 40° C.-50° C. This juice then receives the addition of lime until a pH of about 6.0-6.8 and is submitted to a new final step of indirect heating in the heating unit AQ2. In this step, the juice exchanges heat with the vapor V2 and, posteriorly, with vapor V1, obtaining a juice final temperature of about 105° C.-110° C., passes through a flash balloon for elimination of dissolved gases, receives the addition of a flocculating agent (polyelectrolyte) and follows to a respective decantation unit DC2. The condensates resulting from the condensation of V1 and V2 are conveyed to the process for reuse. As it occurs for the juice fraction in the sugar manufacture, most juice impurities (non-sugars) are removed, generating a stream called sludge, which contains the removed non-sugars (proteins, amino acids, chlorophyll, anthocyanin, mineral impurities, colored compounds, bagacillos and the like) and part of the sugar carried by said stream, and another stream which is the purified juice, called clarified juice. The clarified juice is then conveyed to the preparation of the must, by mixing adequate proportions of juice with the molasse, until obtaining a concentration adjusted to the fermentation process.

The must destined to the fermentation has also to undergo a screening process for elimination of residual bagacillos, preferably, in screens with openings smaller or equal to 0.10 mm. This juice, eventually, can undergo a pre-evaporation process to increase the concentration of fermentable sugars in the must.

The must is then cooled in RM1 until about 28° C.-32° C., using indirect contact device which uses, as cold fluid, water recovered from vegetal vapor condensates that are cooled in a cooling tower TR. The must is submitted to an alcoholic fermentation process in the fermentation section FE1 using yeast (strains of *Saccharomyces cerevisiae*), generating a fermented must containing about 6% a 16% of ethanol, preferably more than 10%.

The alcoholic fermentation must be adjusted in order to obtain a final alcoholic degree between 6 and 16° GL, more preferably above 10° GL. This is achieved by taking some cares, such as improving the asepsis and effecting a must pre-treatment, for example, by a process of must decantation or flotation, operating with more concentrated must constituted preferably of greater amount of pre-evaporated juice, good monitoring of the fermentation process, good efficiency in the yeast centrifugation process, good treatment of the yeast to be used as a yeast cream, maintaining the fermentation temperature around 30° C.-32° C. (efficient equipment for removing heat from the fermentation), using yeast selected from strains adapted to the conditions, preferably in the mill itself, and which presented good performance and, finally, through a good monitoring of the process as a whole.

The cooling in the fermentation section FE1 is effected by indirect thermal exchange devices, whose cold fluid is the vegetal vapor condensate water coming from a cooling tower TR. Then the fermented must undergoes a process for separating the yeast by centrifugation, generating a fermented wine substantially free of yeast which will be sent to the distillation, in which it is obtained, on the top, after the condensation, an ethanol-water binary mixture with about 40%-55% (weight/weight) of ethanol, called phlegm. The yeast, after adequate treatment, returns to the fermentation process. The wine produced in the fermentation section FE1 is submitted to the distillation for obtaining ethanol 96° Gl, comprising two steps. The first step occurs in the distillation section D1, in which the wine is put into boiling at an atmospheric pressure, in an indirect thermal exchange device, in a reboiling system RF1, obtaining, in the lower part of the system (bottom), the vinasse, which contains the solid constituents of the wine, water and a residual alcoholic content lower than 0.05% and, in the upper part (top), alcoholic vapors containing a graduation between 40 and 55° GL (phlegm). The hot fluid used in this step, in the reboiling system RF1, is the vapor V1, but it can also be an exhausted steam or a vegetal vapor coming from the vinasse concentration. The alcoholic vapors obtained on the top of this first step (phlegm) are sent to the second step in a distillation section D2. In this step, the phlegm is fed in countercurrent, in an ascending flow, in which it contacts part of the re-circulated top condensates, in a second condenser CD2. The condensation of these vapors effluent from this second distillation step is carried out in an indirect thermal exchange device, which uses two or more condensation sections. The first step, comprising the second condenser CD2, uses as a cold fluid the fermented wine supplied to the distillation section D1, and the second step uses vegetal vapor condensate water, coming from the cooling tower TR, in a third condenser CD3. The thus obtained ethanol (hydrated) has an alcoholic degree of about 96° GL. The vinasse is conveyed to the evaporation in a vinasse evaporation unit UEV, in multiple effect vacuum evaporators VH1 to VHN, in a cascade system. There are generally provided four to seven vinasse evaporators, preferably five, for example, in the form of falling-film evaporators. In this step the vinasse is fed into the vinasse indirect-contact evaporator VH1, in which it exchanges heat with the vegetal vapor V1 produced in the first evaporator E1. In this step, part of the water contained in the vinasse is evaporated, thus generating a vegetal vapor stream VV1. This vapor is totally or partially supplied to another vinasse evaporator VV2 in which it exchanges heat with the partially concentrated juice effluent from the first evaporator VH1. Thus, it is generated the vapor VV2 which is conveyed to a third vinasse evaporator VH3 in which, through the indirect contact with the juice effluent from VH2, it is generated the vapor VV3. The same occurs successively until reaching the last vinasse evaporator VHN. In the last vinasse evaporator VHN, under a vacuum of about 25 inches of HG°, it is generated a final vapor VVN which, through a fourth condenser CD4, exchanges heat with the wine and is then condensed. The heated wine is sent to feed the second condenser CD2. The condensate generated in the vinasse evaporator VH1 passes through a first compartment TV1, in which it is partially transformed in vapor, by the pressure difference between the evaporators, and returns to the second vinasse evaporator VH2. The liquid part effluent from a second compartment TV2 is conveyed to a third compartment TV3, in which it is submitted again to a partial vaporization process and is sent to the third vinasse evaporator VH3. The liquid part follows to the next compartment and the process is repeated, until reaching the last vinasse evaporator VHN. The condensates of the vinasse evaporators from VH1 to VHN and of the fourth condenser CD4 are mixed and sent to be used in the process.

The vapor effluent from the last evaporative effect, under a vacuum of about 25 inches of Hg°, is condensed in an indirect thermal exchange device, generally defined by the fourth condenser CD4 and the condensating fluid can be at least one of the fluids consisting of wine, mixed juice or water recovered from vegetal vapor condensates and cooled in the cooling tower TR. There is preference for the wine and/or juice, since they allow recovering thermal energy. The condensates generated in this step, after the thermal reuse, are sent to treatment and posterior reuse in the process or for export.

The concentrated vinasse effluent from this unit, defining a source of N, P, K and micronutrients, presents a concentration of about 30%-65% (weight/weight) of dry material which is conveyed to the manufacturing unit of organo-mineral fertilizer (F.O.M.). In this step, the filter cake coming from the sludge filtrating station FT1 is mixed with ashes from the steam generator unit UG1 in the mixture system MS1. The mixture is conveyed to a drying section ST1, for removing part of the water contained therein. The mixture effluent from the drying section ST1 is impregnated with concentrated vinasse in a second mixture device MS2 and subsequently conveyed to a drying and granulating device SG1, removing part of the water contained therein. The product is a granulate solid with about 10% of moisture, called organo-mineral fertilizer (F.O.M).

By adopting the proceedings and operations previously described, it is possible to produce from one ton of sugar cane (tc) an excess of water of about 280 to 300 kg, an amount of organo-mineral fertilizer (10% of moisture) of about 50-70 kg, an amount of electric energy to be exported of about 68.8 kWh, a sugar amount of about 68 kg (0.05% of moisture) and an ethanol amount of 36.5 kg.

Ethanol Production

Figure 2:
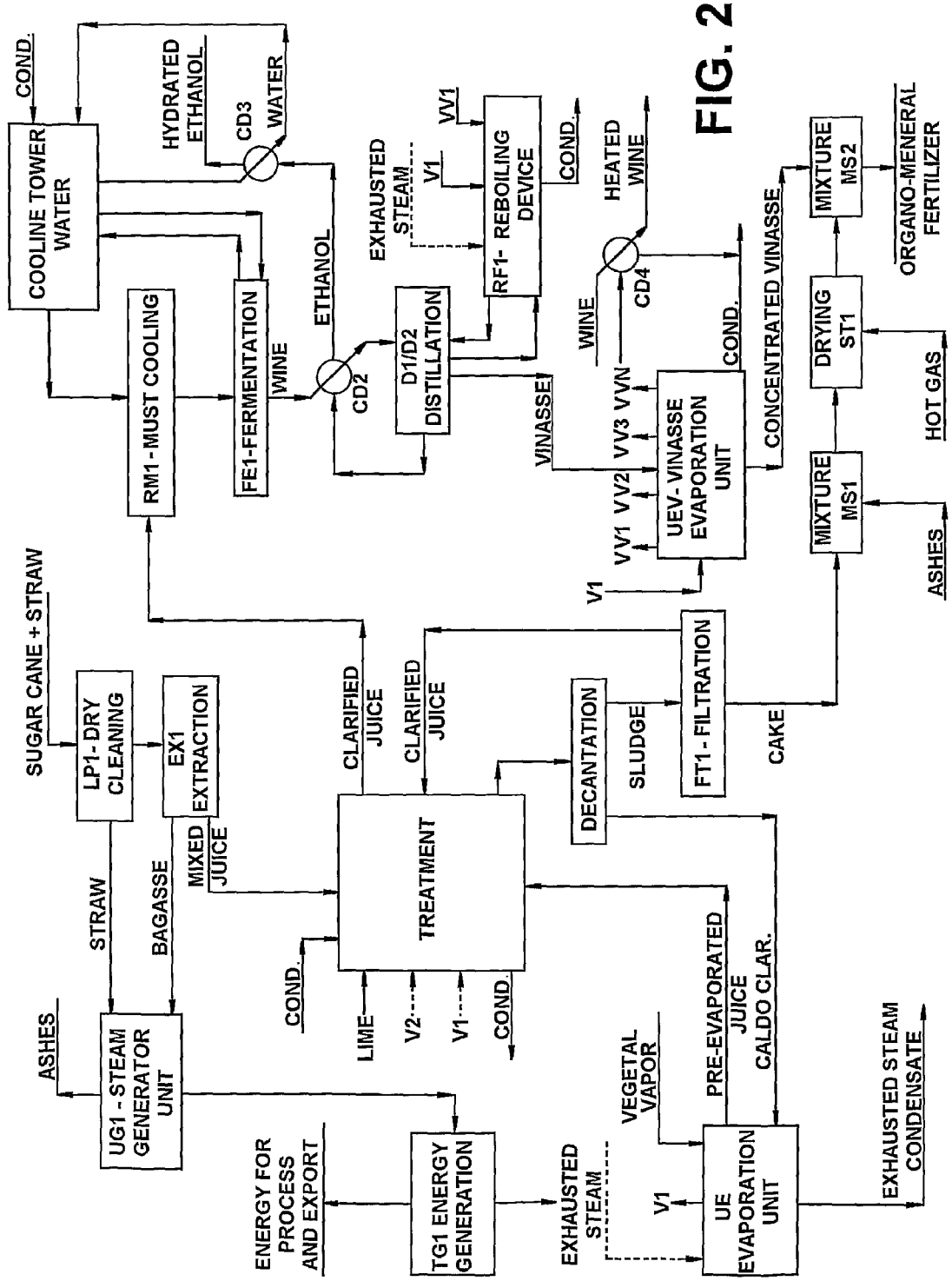
FIG. 2 represents a simplified flowchart of the process of the invention, when applied in the alcohol production.
Figure 2A:
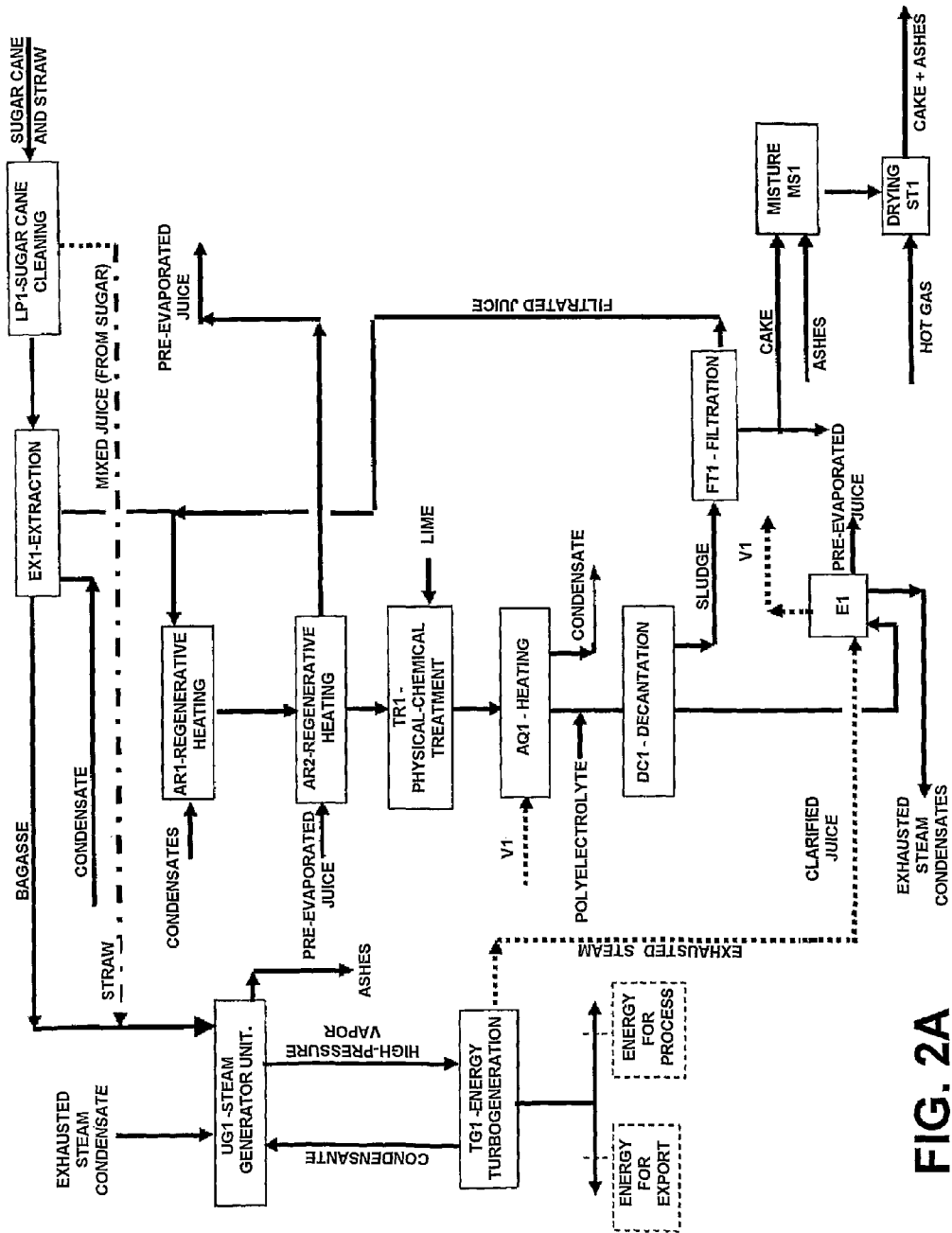
FIGS. 2A and 2B together represent the flowchart of FIG. 2 in greater details.
Figure 2B:
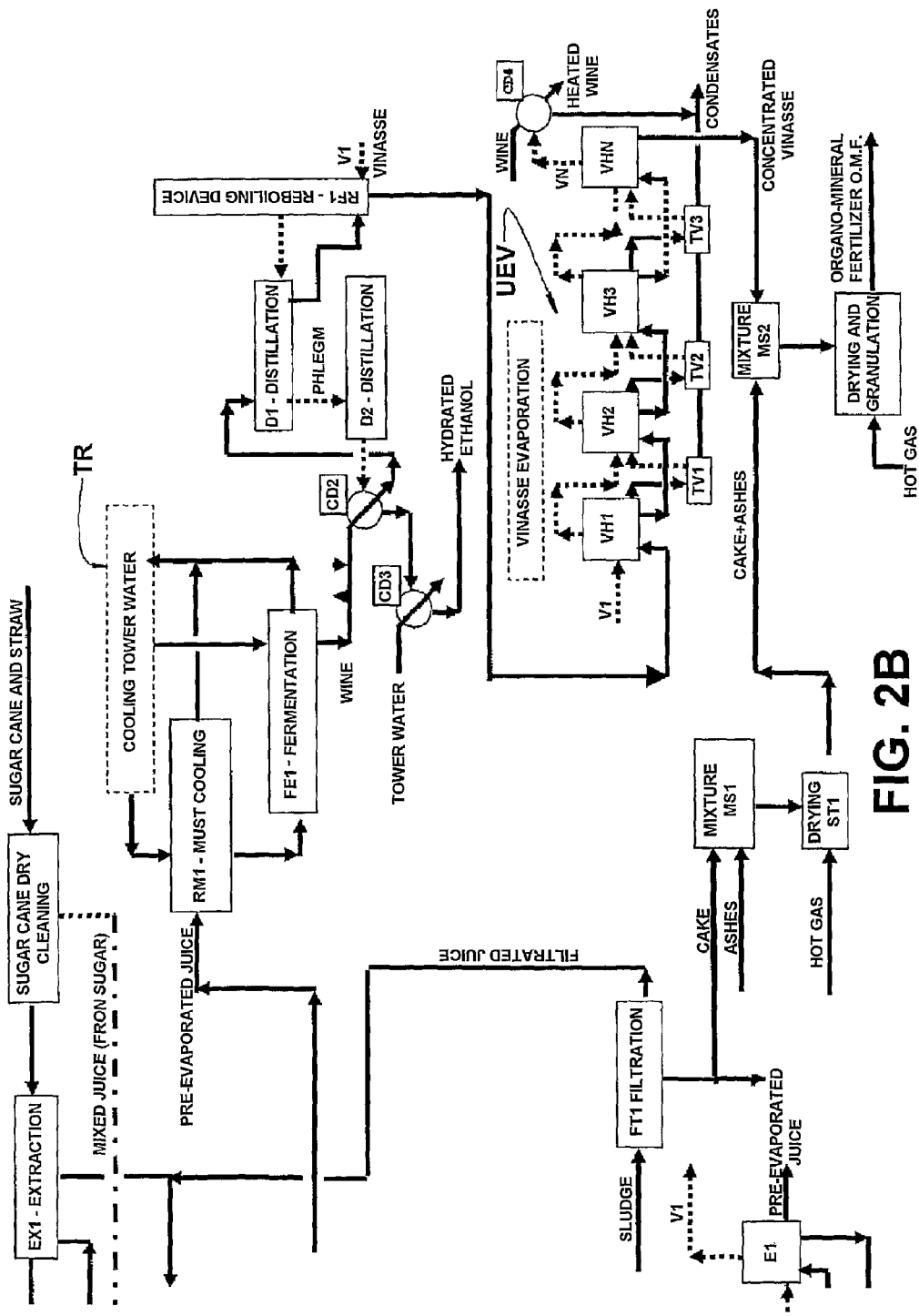

In the production process of ethanol, energy, organo-mineral fertilizer and recovery of water, the sugar cane and the straw are brought from the plantation site and introduced in the manufacturing process (see FIGS. 2, 2a and 2b). The sugar cane is submitted to cleaning in a dry cleaning system LP1 and to an extraction step in EX1, in which it receives the addition (imbibition) of vegetal vapor condensates recovered from the manufacturing process, generating the bagasse and the mixed juice, in the same way as already described for the combined mills. The bagasse, containing about 50% of moisture, is sent, jointly with the straw, to be burned in the generator unit of a high-pressure steam UG1 and then conveyed to an energy turbogenerator unit TG1, in which electric energy is produced for the manufacturing process and also for the export of its excess to the public electrical network. In this step, it is also generated an exhausted steam for use in the process (exhausted steam at about 127° C.-130° C. and at about 2.5 kgf/cm$^2$ of absolute pressure) and exhausted steam condensates which return to the steam generator unit UG1.

The mixed juice is mixed with a filtered juice effluent from a filtration unit FT1 and, subsequently, undergoes a first heating stage in a first indirect regenerative heating device AR1, where it exchanges heat with the vegetal vapor condensates recovered in the process. Next, the mixed juice undergoes a second heating stage in a second indirect regenerative heating device AR2, in which it exchanges heat with the pre-evaporated juice effluent from an evaporation unit E1 and is sent to a physical-chemical treatment unit TR1, in which it receives the addition of lime milk until a pH of about 6.0-6.8. The treated juice is then heated by indirect contact with vapor V1 coming from the evaporation unit E1, until a temperature between 105° C. and 110° C., passes through a "flash" for elimination of dissolved gases, receives the addition of a flocculating agent (polyelectrolyte) and follows to a decantation unit DC1. In this step, most juice impurities (non-sugars) are removed, generating a stream called sludge, which contains the removed non-sugars (proteins, amino acids, chlorophyll, anthocyanin, mineral impurities, colored compounds, bagacillos and the like) and part of the sugar carried in the juice surrounding the sludge. This sludge is sent to the filtration unit FT1, in which there is generated a stream called filtered juice, which is conveyed to be mixed with the mixed juice, and the filter cake, which is conveyed to a production unit of organo-mineral fertilizer. The other part effluent from this decantation unit DC1 is the purified juice called clarified juice. This juice is then sent to screening for elimination of residual bagacillos, preferably in screens with openings smaller than or equal to 0.10 mm, and to the evaporation unit E1, in which it exchanges heat, by indirect contact, with the exhausted steam produced in the turbogenerator unit TG1. In this step, part of the water contained in the juice is evaporated, thus generating a vegetal vapor stream V1. This vapor is used for heating the juice in the distillation units and for vinasse concentration, as described below. The condensate, generated in the evaporation unit E1, is collected in the compartment T1 and returns to the steam generator unit UG1. The juice, which is pre-evaporated until about 20-30° Brix, preferably 25° Brix, and at a temperature of about 110° C. to 117° C., effluent from the evaporation unit E1, is partially cooled in a regenerative thermal exchange unit (AR2) with the extracted juice (35° C.-40° C.) and, subsequently, cooled in an indirect thermal exchange device in a cooling unit RM1. The cold fluid used in this unit is water, at about 28° C., which is recovered from the condensation of vegetal vapor coming from the cooling tower TR. The pre-evaporated and cooled juice eventually receives the addition of nutrients adequate to the fermentation process and receives, from then on, the denomination of must. The must is then sent to an alcoholic fermentation unit FE1, using yeast (strains of Saccharomyces cerevisiae) and generating a fermented must containing about 6% to 16% (w/w) of ethanol, preferably more than 10% (w/w).

This is obtained by taking some cares, such as: improving the must asepsis, effecting a pre-treatment of the must, for example, by process of must decantation or flotation; operating with a more concentrated must which is preferably constituted of a greater amount of pre-evaporated juice; good monitoring of the fermentation process; good efficiency in the yeast centrifugation process; good treatment of the yeast in the yeast cream; maintenance of the fermentation temperature around 30° C.-32° C. (efficient equipment for removing heat from the fermentation); yeasts selected from the strains preferably selected in the mill and which present a good performance; and a good monitoring of the process as a whole. The cooling of the fermentation unit FE1 is effected by indirect thermal exchange devices, using, as cold fluid, the water of the cooling tower TR. The fermented must is then submitted to a process for separating the yeast by centrifugation, generating a fermented wine, substantially free of yeast, which will be conveyed to distillation. The yeast, after adequate treatment, returns to the fermentation process. The wine produced in the fermentation unit FE1 is submitted to distillation for obtaining ethanol 96° Gl, comprising two steps. The first step occurs in a first distillation section D1, in which the wine is put into boiling, at a substantially atmospheric pressure, in an indirect thermal exchange device, by a reboiling device RF1, obtaining, in the lower part (bottom), the vinasse, which contains the solid constituents of the wine, water and a residual alcoholic content lower than 0.05% and, in the upper part (top), alcoholic vapors containing a graduation between 40 and 55° GL (phlegm). The hot fluid used in this step in the reboiling device RF1 is the vapor V1, but it also can be the exhausted steam or vegetal vapor coming from the vinasse concentration unit. The alcoholic vapors obtained on the top of this first step (phlegm) are sent to the second distillation section D2. In this step, the phlegm is fed in countercurrent, in an ascending flow, in which it is brought into contact with part of the top condensates re-circulated from a second condenser CD2. The condensation of these vapors, effluent from this second distillation step, is effected in an indirect thermal exchange device, for example, the second condenser CD2, and it can also include a third condenser CD3 which defines a third stage. I should be noted that the first step uses, as cold fluid, the fermented wine supplied to the first distillation section D1 and a second step which uses vegetal vapor condensate water coming from the cooling tower TR, in the third condenser CD3. The thus obtained ethanol (hydrated) has an alcoholic degree of about 96° GL. The effluent vinasse between about 95° C.-115° C., containing between about 4% to 8% of total solids, is conveyed to a vinasse evaporation unit UEV constituted of multiple effect vacuum evaporators VH1 to VHN, in a cascade system. The vinasse evaporation unit UEV comprises from four to seven evaporators, preferably five, for example, falling-film evaporators. In this step, the vinasse is fed into the first indirect-contact evaporator VH1, in which it exchanges heat with the vegetal vapor V1 produced in the evaporation unit E1. In this step, part of the water contained in the vinasse is evaporated, thus generating a vegetal vapor stream VV1. This vapor is fed into the second evaporator VV2, in which it exchanges heat with the partially concentrated juice effluent from the first evaporator VH1. Thus, it is generated the vapor VV2, which is conveyed to the third evaporator VH3, in which, through the indirect contact with the juice effluent from the second evaporator VH2, it is generated the vapor VV3. The same occurs successively, until reaching the last evaporator VHN. In the last evaporator VHN, under a vacuum of about 25 inches of HG°, it is generated a final vapor VHN which, through an indirect contact device, for example, a fourth condenser CD4, exchanges heat with the wine and is then condensed. The heated wine is then sent to feed a second condenser CD2. The condensate generated in the first evaporator VH1 passes through a first compartment TV1, in which it is partially transformed in vapor (flash), by the pressure difference between the effects, returning to the second evaporator VH2. The liquid part effluent from a second compartment TV2 is conveyed to a third compartment TV3, in which it undergoes again a partial vaporization process and is sent to the third evaporator VH3. The liquid part follows to the next compartment, repeating the process until reaching the last evaporator VHN. The condensates of the evaporators VH1 to VHN and of the fourth condenser CD4 are mixed and sent to be used in the process.

Regarding the production of anhydrous ethanol 99.6° GL (see FIG. 4), the hydrated ethanol in the form of vapor at 96° GL is heated up to about 150° C., in an indirect thermal exchange device, using, for the heating, vapor at an absolute pressure of about 7.0 kgf/cm$^2$, and then it is supplied to the zeolite adsorbent columns (molecular sieve), in which water is retained and ethanol released in the vapor form at 99.6° GL. The columns operate with an absolute pressure of 4.0 kgf/cm$^2$ and the regeneration of the zeolites occurs through a vacuum system.

The concentrated vinasse effluent from this unit, at a concentration of about 45%-60% (w/w) of dry material and defining a source of N, P, K and micronutrients, is conveyed to a manufacturing unit of organo-mineral fertilizer (F.O.M.). In this step, the filter cake coming from the sludge filtrating station FT1 is mixed with the ashes of the steam generator unit UG1, in a first mixture system MS1. The mixture is then conveyed to drying in ST1, in which part of the water is removed. The mixture effluent from ST1 is impregnated with concentrated vinasse in a second mixture system MS2 and, subsequently, conveyed to drying and granulation in a device SG1, removing part of the water contained therein. The product is a granulate solid with about 10% (w/w) of moisture. By adopting the proceedings and operations previously described, it is possible to produce, from one ton of sugar cane (tc), an excess of water of about 220 to 250 kg, an amount of organo-mineral fertilizer (10% of moisture) of about 70-72 kg, an amount of electric energy to be exported of about 68.8 kWh and a production of ethanol of 67.6 kg, in the form of hydrated ethanol (96° GL).

Sugar Production

Figure 3:
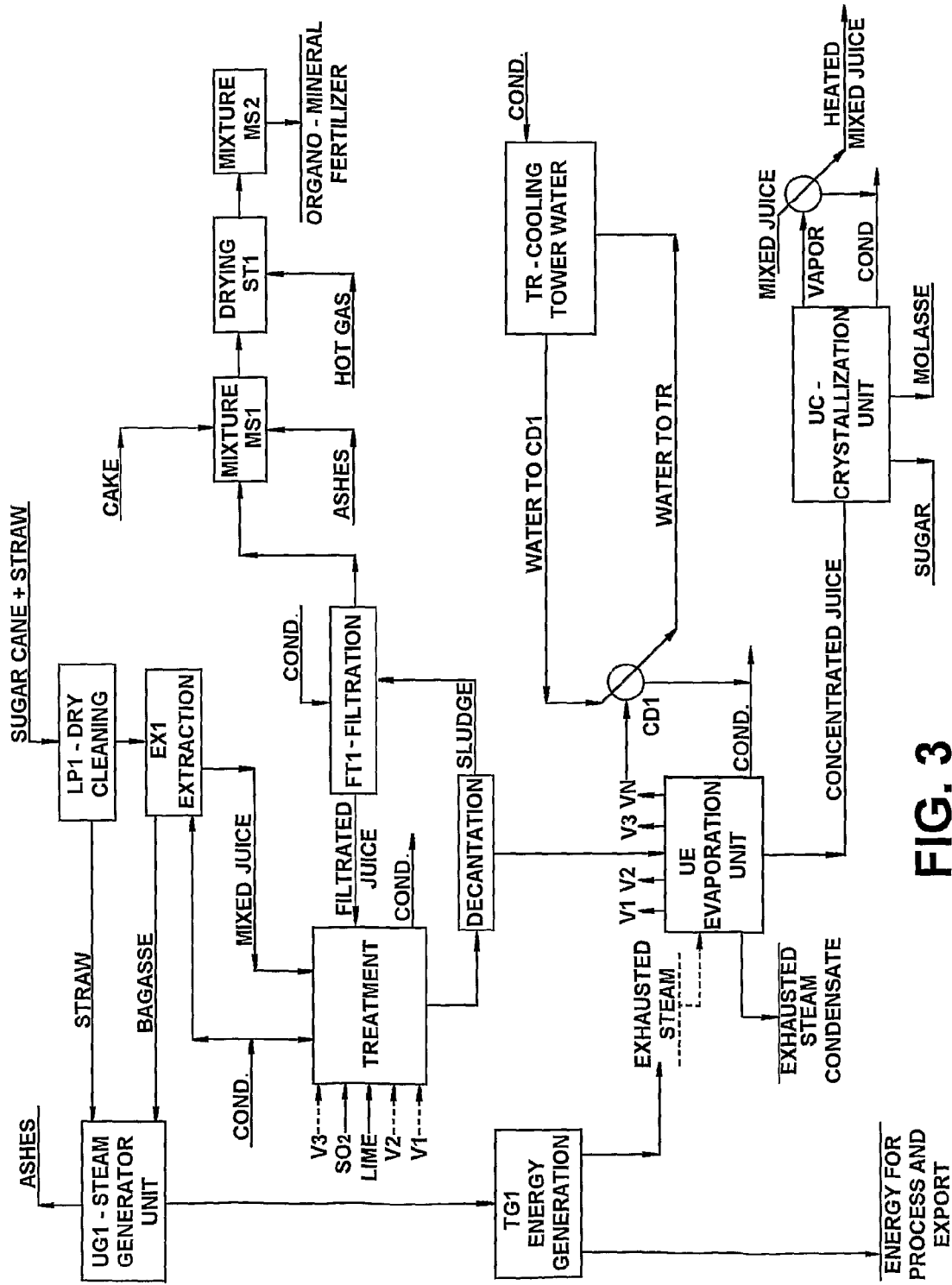
FIG. 3 represents a simplified flowchart of the process of the invention, when applied in the sugar production.

In the integrated production process of sugar, energy, organo-mineral fertilizer and recovery of water (see FIGS. 3, 3A and 3B), the sugar cane and the straw are brought from the plantation site and introduced in the manufacturing process, in order to be submitted to the same operations of dry cleaning, juice extraction, high-pressure vapor production, energy generation and exhausted steam generation, in the same way as already previously described in relation to the sugar and alcohol production process, in the combined mills, and regarding the ethanol production process only in the autonomous mills.

The mixed juice is then heated in an indirect regenerative heating system in AR1, in which it exchanges heat with part of the vegetal vapor condensates recovered from the process and, subsequently, with a vapor V3, which is obtained from an evaporator E3 of an evaporation unit UE, to be commented ahead. The mixed juice effluent from this system must have a temperature between 40° C. and 50° C. and, subsequently, will be submitted to the sulfitation process until a pH of about 4.0-4.8 (in case the white crystal sugar is produced) and to liming until a pH of about 6.8-7.5 in a treatment unit TR1. The treated juice is then heated, in a heating unit AQ1, by indirect contact with vapor V2, coming from a second evaporator E2, to be commented ahead and, subsequently, heated with vapor V1 coming from a first evaporator E1. The thus heated juice must be at a temperature between 105° C. and 110° C., passes through a flash balloon for elimination of dissolved gases, receives the addition of a flocculating agent (polyelectrolyte-n usually a polyacrylamide) and follows to a decantation unit DC1. In this step, most juice impurities (non-sugars) are removed, generating a stream called sludge, which contains the removed non-sugars (proteins, amino acid, chlorophyll, anthocyanin, mineral impurities, colored compounds, bagacillos and the like) and part of the carried sugar (contained in the juice which surrounds the sludge), and another stream which is the purified juice, called clarified juice.

The clarified juice is then sent to the evaporation unit UE, generally formed by a plurality of evaporators E1, E2 . . . EN, generally from four to six, and preferably five. The clarified juice is fed into a first indirect-contact evaporator E1, in which it exchanges heat with the exhausted steam coming from the turbogenerator unit TG1. In this step, part of the water contained in the juice is evaporated, thus generating a vegetal vapor stream V1. This vapor is fed into the next second evaporator E2, in which it exchanges heat with the partially concentrated juice effluent from the first evaporator E1. Thus, it is generated the vapor V2 which is conveyed to the next third evaporator E3, in which, through an indirect contact with the juice effluent from the second evaporator E2, it is generated the vapor V3. The same occurs successively, until reaching the last evaporator En. In the last evaporator En, under a vacuum of about 25 inches of HG°, it is generated a final vegetal vapor Vn which, through an indirect contact device, generally in a first condenser CD1, exchanges heat with at least one of the cold fluids defined between mixed juice or vegetal vapor condensate cooled in the cooling tower TR. The heated mixed juice (an adequate fraction of the total, which is sufficient for condensation of said vapor) is sent to feed the step in which the regenerative heating in AR1 occurs. The condensate generated in the first evaporator E1 is collected in a first compartment T1 and returns to the steam generator unit UG1. The condensate generated in the second evaporator E2 passes through a second compartment T2, connected to the second evaporator E2, in which it is partially transformed in vapor, by the pressure difference ("flash") between the evaporators, returning to the third evaporator E3. The liquid part effluent from the second compartment T2 is conveyed to a third compartment T3, in which is submitted again to a partial evaporation process and is conveyed to the fourth evaporator E4. The liquid part follows to the next compartment, repeating the process until reaching the last evaporator En. The condensates originating from the second to the last evaporator E2 to En and from the first condenser CD1 are mixed and sent to be used in the process.

The concentrated juice effluent from the evaporation unit UE, called syrup, at a concentration of about 60-65° Brix is sent to the sugar crystallization unit UC.

Figure 3A:
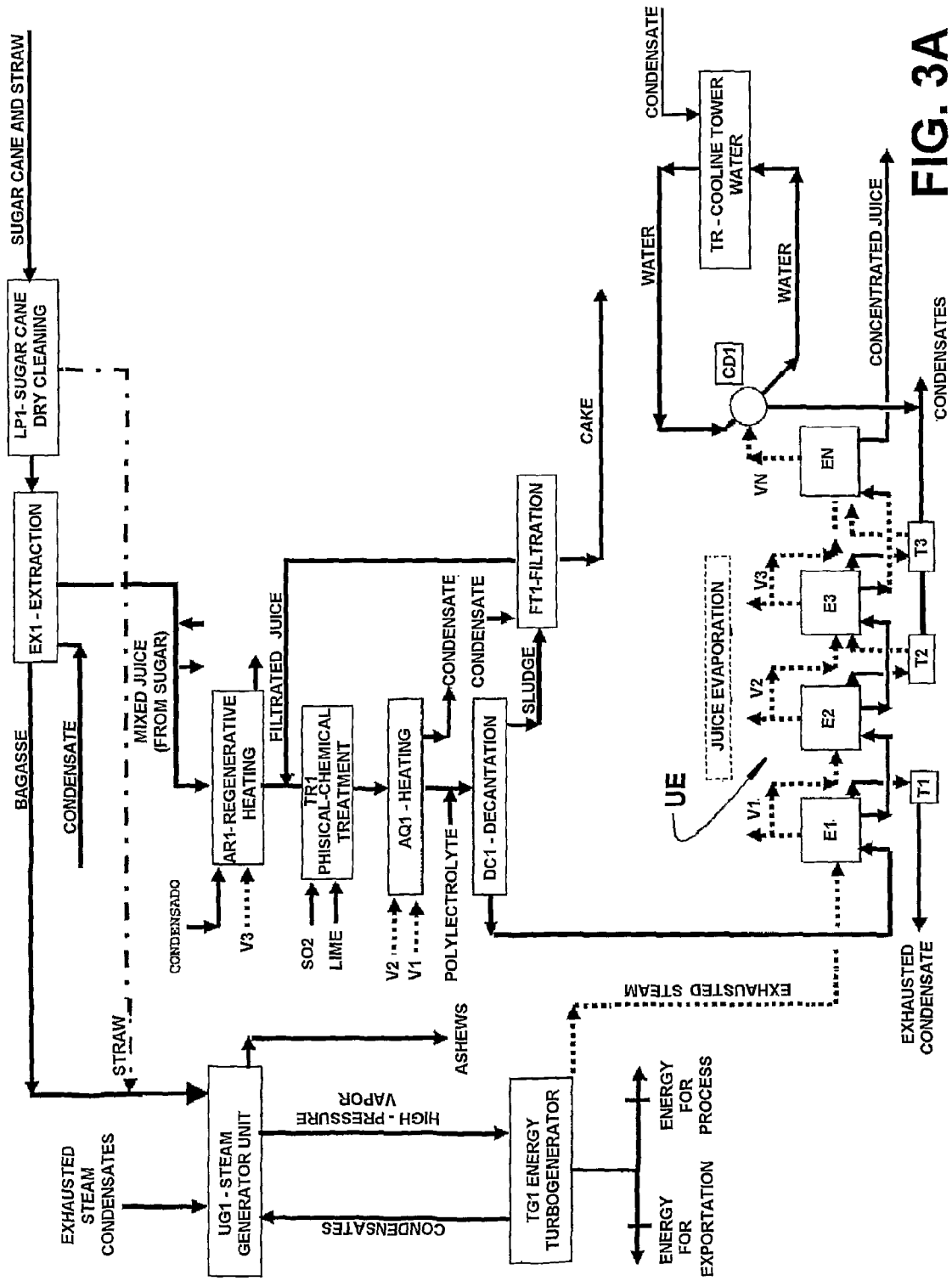
FIGS. 3A and 3B together represent the flowchart of FIG. 3 in greater details.
Figure 3B:
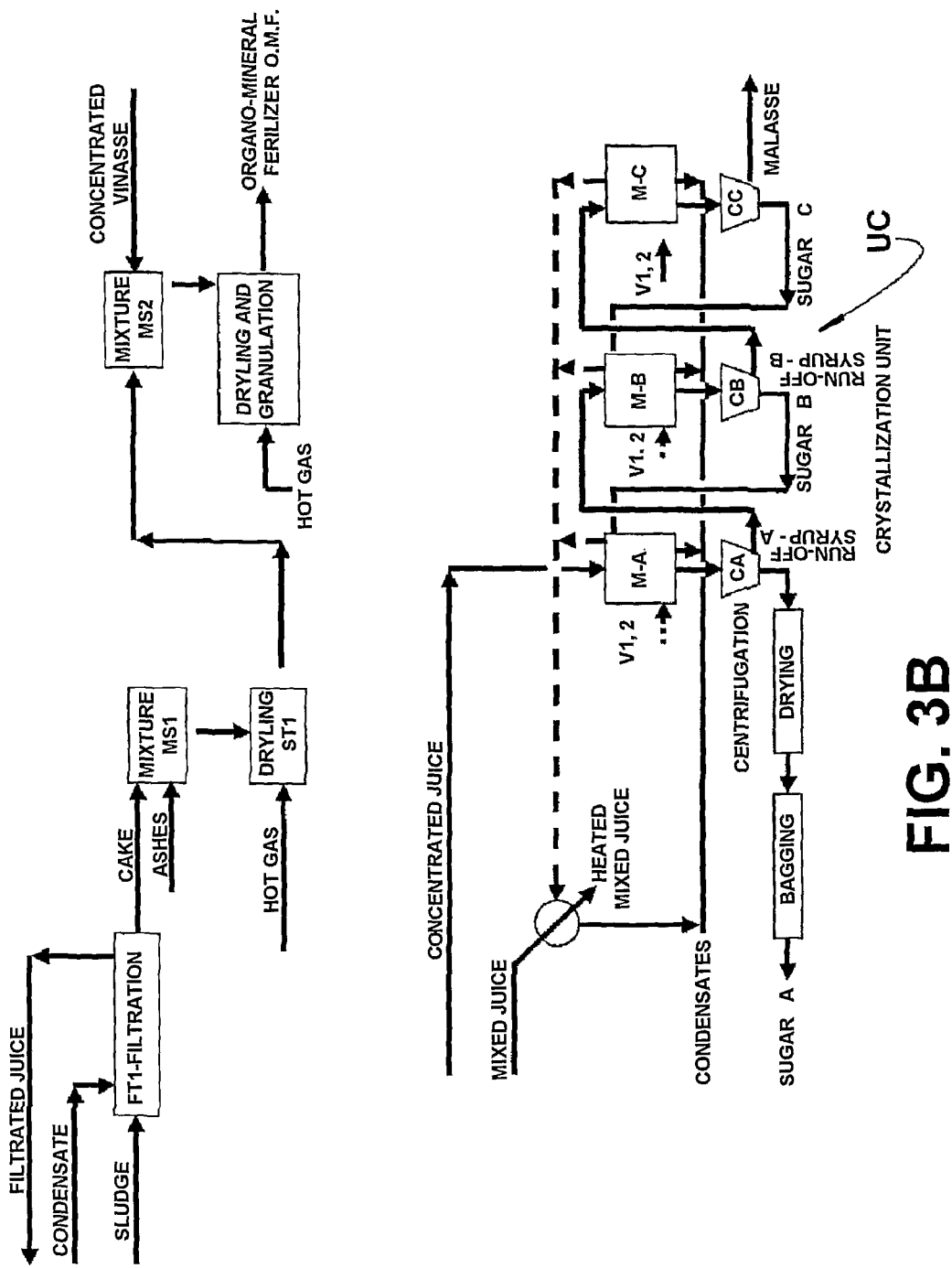

The sugar crystallization unit can consist of two masses, A and B, or three masses A, B and C. FIGS. 3A and 3B illustrate a crystallization unit UC of three masses. The syrup previously obtained is fed into the cooker (evaporating crystallizer) M-A, which received sugar B after an adequate syrup concentration (seeding point), being adequately evaporated and crystallized until the sugar crystals reach an adequate size. The crystallized material, containing about 50%-55% of sugar crystals and so-called mass A, is fed into a centrifugation system CA, in which the crystals are separated from the final run-off syrup A (mother liquor). The crystals are washed with addition of condensate and vapor V1 for removal of the residual run-off syrup remaining from the initial centrifugation, generating the wet sugar A. The run-off syrup A is sent to the cooking B, jointly with the sugar C (magma) which is added after the run-off syrup A reaches the seeding point. Identically to the mass A, the run-off syrup A is evaporated and adequately crystallized in the crystallizer M-B, generating the mass B, rich in crystals, which is centrifuged, washed with condensate and vapor in the centrifugation device CB, generating the sugar B, which is adequately fed, as crystallization seed (seeding) of the mass A. The mass C is obtained through the evaporation of the run-off syrup B, which is adequately crystallized by addition of a crystallization germ in the crystallizer M-C, generating the mass C, rich in crystals, which is centrifuged, washed with condensate and vapor in the centrifugation device CB, generating the sugar C (magma C), which is fed as crystallization seed of the mass B. The sugar A is sent to the drying section SA1 and, subsequently, to the bagging section ES1. All the cooking stages can preferably operate with vegetal vapor V1 or V2 or also with exhausted steam. The end syrup (run-off syrup C) produced is exported to other industrial units for several uses and mainly for ethanol production in combined units or autonomous distilleries.

By adopting the proceedings and operations previously described, it is possible to produce, from one ton of sugar cane (tc), an excess of water of about 280 to 300 kg, an amount of organo-mineral fertilizer (10% of moisture) of about 35-37 kg, an amount of electric energy to be exported of about 68.8 kWh and an amount of sugar of about 85-87 kg (0.05% of moisture) and an amount of molasse of about 50-52 kg.

Figure 4:
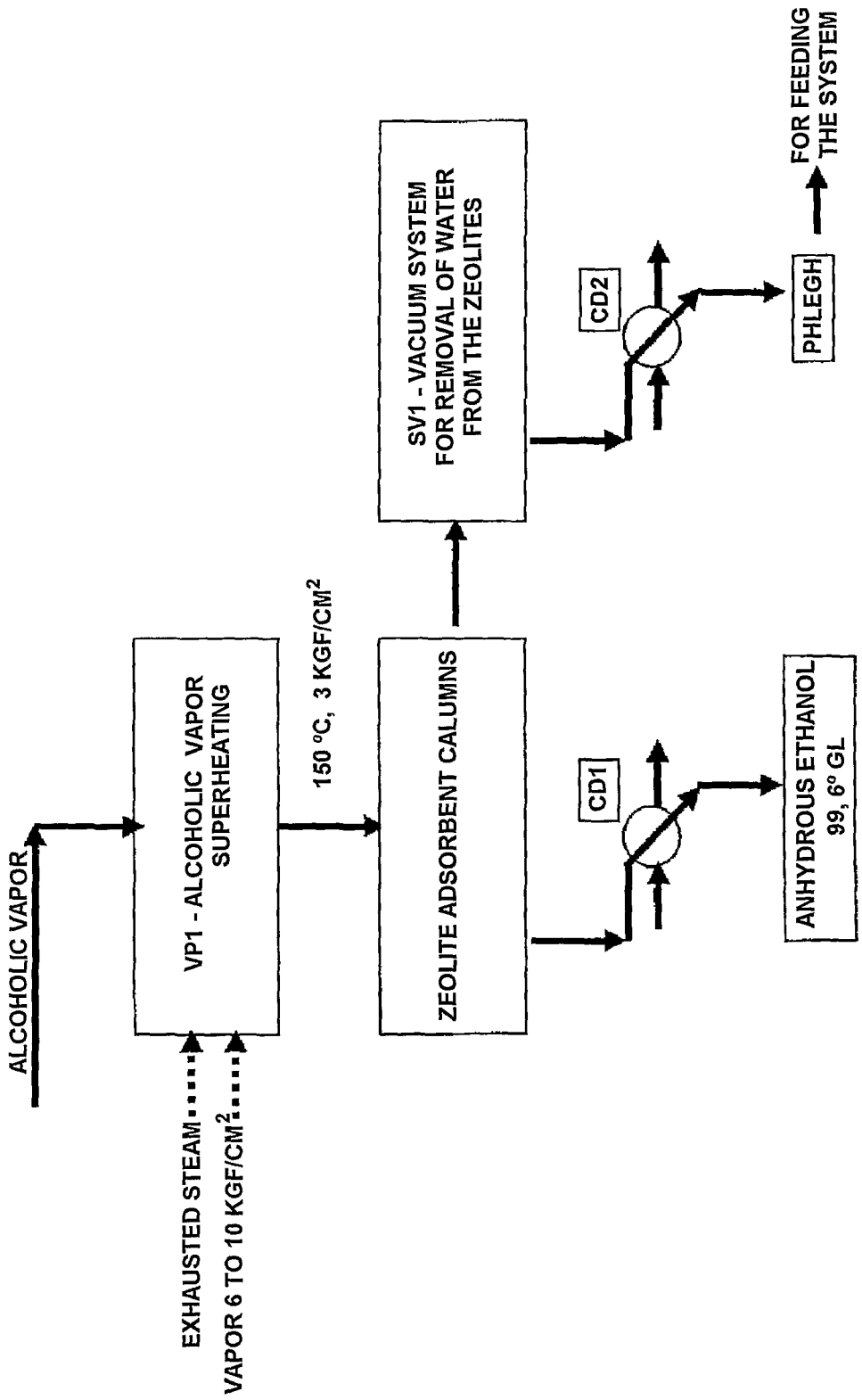
FIG. 4 represents the flowchart of the process for production of anhydrous ethanol and which can be applied to both the process defined in the flowchart of FIGS. 1, 1A and 1B and the process defined in the flowchart of FIGS. 2, 2A and 2B.

As illustrated in the flowchart of the process of FIG. 4, in the case of production of anhydrous ethanol, 99.6° GL, the hydrated ethanol in the form of vapor at 96° GL is heated up to about 150° C. (at an absolute pressure of about 3.0 kgf/cm$^2$) in an indirect thermal exchange device VP1 in two stages. The first stage uses exhausted steam (at an absolute pressure of about 2.5 kgf/cm$^2$) and the second vapor at an absolute pressure of about 6.0 to 10 kgf/cm$^2$. The alcoholic vapor effluent from the device VP1, at about 150° C. (4.0 kgf/cm$^2$) is then fed into the zeolite adsorbent columns (molecular sieve), in the system SV1, in which water is retained and the ethanol is released in the form of vapor at 99.6° GL. The vapor of anhydrous ethanol (99.6° GL) is condensed in an indirect thermal exchange device, the first condenser CD1, which uses, as cold fluid, water coming from the cooling tower. The columns CL1 of the system are restored, after a determined time of operation, by removing the water adsorbed in the zeolites. This operation is made through the application of vacuum (pressure at about 0.35 kgf/cm$^2$) effected by the system SV1. This operation generates a vapor stream containing predominantly water and residual ethanol. These vapors are condensed in the other indirect thermal exchange device, that is, in the second condenser CD2, which uses, as cold fluid, the water coming from the cooling tower TR, generating a condensate called phlegm which is sent to the wine distillation system, in its first reaction D1, as illustrated in FIGS. 1B and 2B.

In the described process, object of this patent application, it is foreseen the rational use of water in the sugar and/or ethanol manufacturing process. There are provided measures for economy of energy and rationalization of water use, in view of eliminating the water capture and generating hydric excess; maximum reuse and recovery of the water in the process; maximization of generation of energy (electric and vapor) from renewable source, bagasse and straw; maximum reuse of solid and liquid residues for production of a granulated solid organo-mineral fertilizer, so as to reduce the consumption of non-renewable source (mainly petroleum); and, finally, with the purpose of increasing the profitability of the sugar and alcohol industry complex, minimizing the environmental problems associated with water and soil contamination. In this process, until about 50% of the straw (fine straw) generated in the plantation site of sugar cane, during the harvest, can be conveyed to the manufacture, to be burned in a boiler, in order to generate electric energy and steam. This additional energy source is further used to be exported to the public network. The other part of the straw must remain in the plantation site, so as to minimize the soil losses by evaporation and transpiration, to reduce plague infestation, and to be used as fertilizer, among other beneficial effects.

The sugar cane brought to the process is cleaned through a series of mechanical and pneumatic devices, by a technique called dry cleaning. In this process, through the cited devices, it is provided the removal of part of the impurities brought from the plantation site, jointly with the sugar cane, without the need of washing the sugar cane. Thus, it is eliminated almost half the need for water capture by the mill. The activation of the extraction system (diffusers or attrition mills) is effected through the driving, preferably, by electric motors, which have greater efficiency in relation to the driving effected by turbines. In one of the preferred forms of the invention, in the juice extraction process, the imbibition (addition of water in the last extractive effect) is effected exclusively with water recovered from the sugar cane supplied to the system, more specifically, through the rational reuse of the vegetal vapor condensates recovered from the sugar and/or ethanol manufacturing process, to which is applied a rigid control to avoid sucrose from being carried. The heating of the sugar cane juice, coming from the extraction and destined to the physical-chemical treatment of coagulation and flocculation and posterior decantation of impurities, is effected by regenerative indirect thermal exchange devices, between the cold fluid, defined by the mixed juice, and the condensates recovered from the evaporation of the juice and/or crystallization of the sugar and/or of the condensate resulting from the condensation of the vegetal vapors used in the heating of the juice chemically treated (sulfitation, liming, flocculation).

The condensates generated are re-circulated for thermal recovery and reuse in the process, for example, for imbibition.

The alcoholic fermentation must be adjusted, so as to obtain a final alcoholic degree between 6 and 16° Gl, more preferably above 10° GL.

The generation of vapor is made in boilers of high-pressure, from 45 to 100 kgf/cm$^2$, preferably 100 kgf/cm$^3$, exactly as already previously described in the present specification, the exhausted steam being sent to the sugar and/or alcohol manufacturing process. The boilers generate high-pressure vapor, called direct vapor, from the burning of bagasse resulting from the extraction of juice from the sugar cane and extraction of the straw. The cooling waters used in the process for condensation, cooling of the vats (fermenters), and of the must are cooled in the cooling tower TR.

The filter cake produced in the filtrating station and the ashes obtained, and a small fraction of the molasse in substitution to the vinasse (in order to obtain the mixture granulation effect) produced in the process are then submitted to the production of an organo-mineral fertilizer (FOM), according to the proceeding described in the co-pending Brazilian patent application of the same applicant. This process basically comprises the steps already previously defined.

Figure 5:
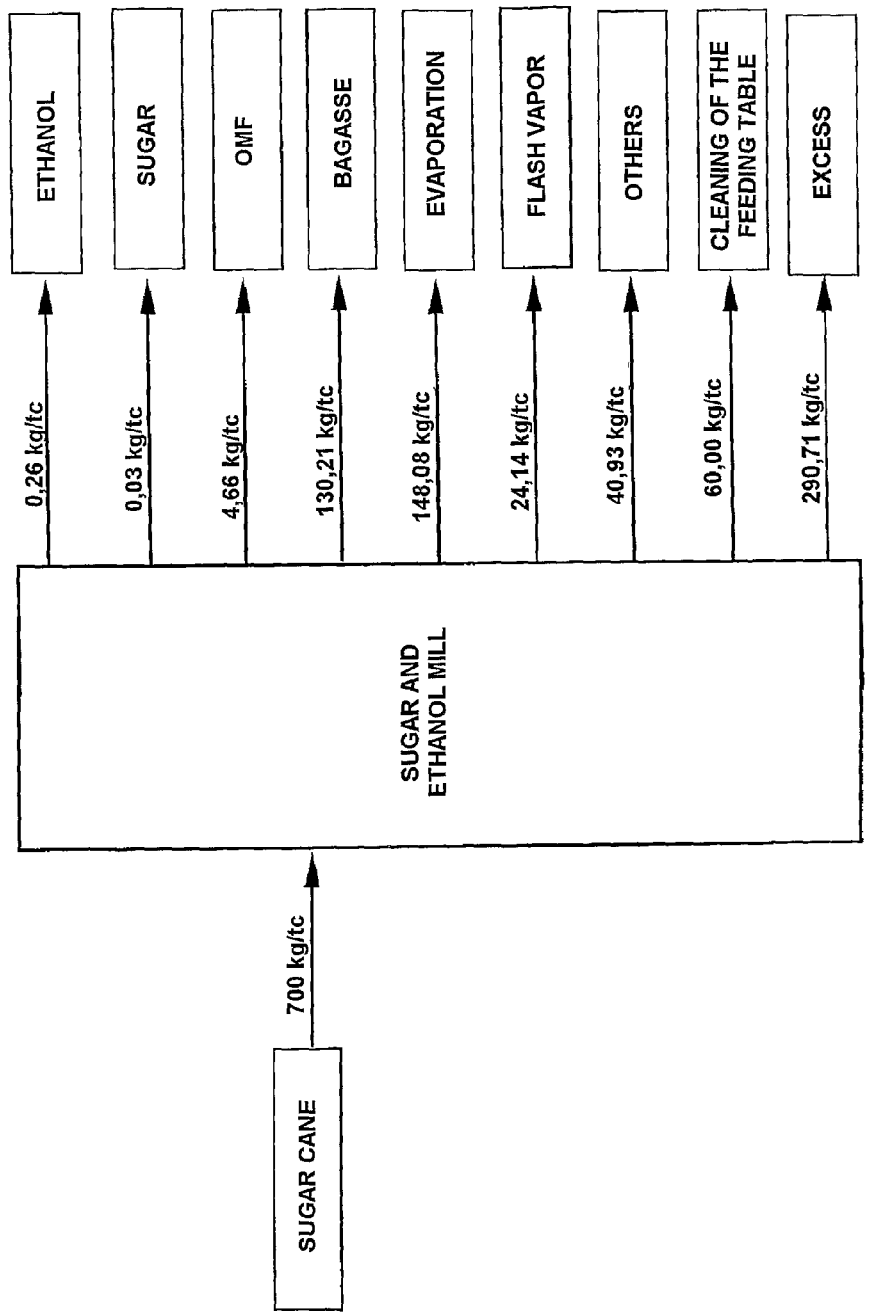
FIGS. 5 and 6 represent graphs illustrating the excess of water obtained in the different sugar cane processing phases in sugar and ethanol production mills and in ethanol mills, respectively.
Figure 6:
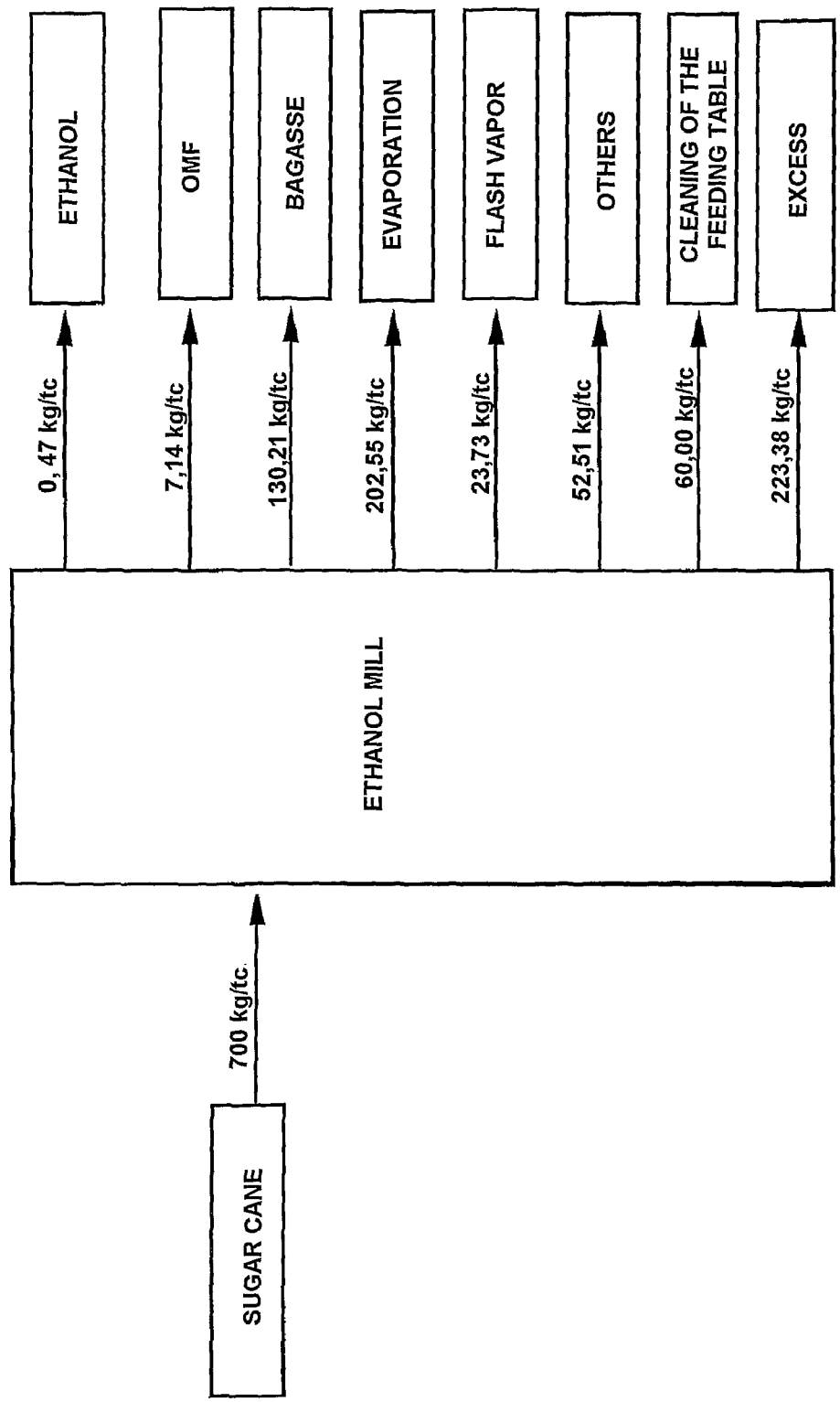

In FIGS. 5 and 6 there are discriminated, by way of example, the water volumes recovered in each step of the manufacturing process, for combined mill and for autonomous distillery, respectively.

The recovered waters comprise the condensates of the vinasse evaporation, condensate vapors from all the juice evaporators, except that of the first evaporator (combined mill) and also of the syrup cooking (combined mill) and the condensates of the distillation condensers which use vapor V1. This excess of water can be used directly in the irrigation for industrial consumption or, after adequate treatment, exported to the public network. By opting to use this water for domestic consumption, the water must be submitted to a system consisting, for example, of an anaerobic treatment step, followed by an aerobic treatment (for example, by activated sludges), a physical-chemical treatment and, finally, the chlorination or ozonization. The expected organic load of the condensates, BOD, is of 300 mg/L and the COD is of about 2,000 mg/L. In the first step (anaerobic), an efficiency of removal of COD of 80%, allows a generation of biogas of 0.45 $Nm^3$/kg removed COD and the excess of sludge is of 0.05 kg/kg of removed COD. The generated biogas usually has a compound of about 70% methane, 29% $CO_2$, 0.5% $H_2S$ and traces of $N_2$, $H_2$ and saturated water. This biogas can optionally be used to generate electric power or combustion gas for a chiller system, to refrigerate process water used for cooling vats (fermenters). The water can be supplied to the public network for domestic or industrial consumption. The proceedings proposed herein allow the industry to change the condition of water importer to water exporter, generating its own energy from renewable source and exporting it to the public network, transforming the solid residues generated in the sugar manufacture (filter cake) and ethanol (filter cake and vinasse) and in the boilers (chimney gas and ashes for heating), in a granulated solid organo-mineral fertilizer, besides guaranteeing the efficient production of sugar and ethanol. The result is a lower fossil fuel consumption, the environment preservation, economic savings with water capture and waste disposition, reduction of the transport fleet and equipment used for transport and distribution of vinasse, ashes and cake, with fertilizer purchase economy by re-circulating the solid rejects rich in nutrients (mainly potassium), and with a lower operational cost, and the possibility of exporting water to the public network.

The invention claimed is:

1. A process for the recovery of water and energy from the processing of sugar cane in sugar and ethanol production mills, using the sugar cane straw and bagasse as energy source for an electric energy and steam generation unit and comprising the steps of:

a—submitting the sugar cane to a juice extraction operation with imbibition by condensates recovered from vegetal vapor;

b—treating and purifying the extracted juice, using vegetal vapor condensate, evaporation vegetal vapor and inputs, and producing a clarified juice flow, a sludge flow and a vegetal vapor condensate flow;

c—treating the sludge flow, producing a filter cake and a recovered juice flow which is returned to the step of treating and purifying the juice;

d—submitting part of the clarified juice flow to a multiple effect vacuum evaporation unit, under heating by exhausted steam from the energy generation unit, producing: an exhausted steam condensate, to be at least in part returned to the energy generation unit; at least one evaporation vegetal vapor flow; a last effect vegetal vapor flow; a vegetal vapor condensate flow; and a syrup flow;

e—concentrating the syrup until the crystallization point of part of the sucrose contained therein under heating with at least part of the vegetal vapor flow produced in the evaporation unit, producing a crystallization vegetal vapor flow, a vegetal vapor condensate flow and a crystallized product flow (crystallized mass);

f—centrifuging the crystallized product, producing end syrup (molasse) flow and a sugar flow to be dried and bagged;

g—mixing the remaining clarified juice flow with the molasse flow in proportions adequate to the fermentation, and cooling the resulting must by indirect thermal exchange, with at least one of the means defined by an extracted mixed juice flow and a vegetal vapor condensate water flow, at the wet-bulb temperature corresponding to the ambient temperature, circulating by a cooling tower unit;

h—maintaining the fermentation temperature between 25° C. and 36° C., by indirect thermal exchange with the vegetal vapor condensate water flow circulating by a cooling tower unit;

i—fermenting the cooled must, producing a wine flow, and distillating the wine to produce ethanol and vinasse, wherein: the extracted juice (mixed juice) is pre-heated in the cooling of the must and heated by regenerative indirect thermal exchange with at least one of the flows defined by last effect vegetal vapor of the evaporation unit and by the crystallization vegetal vapor, transforming said vapor flows in vegetal vapor condensate flows; the step of distillating the wine is carried out with the indirect heating of the wine by at least one of the means defined: by part of the evaporation vegetal vapor flow; by part of the exhausted steam flow; and by a vinasse vegetal vapor flow, producing an alcoholic vapor flow and at least one of the flows defined by vegetal vapor condensate and by exhausted steam; the alcoholic vapor flow is condensed by indirect thermal exchange with at least one of the flows defined by fermented wine and by vegetal vapor condensate water of the cooling tower unit; the vinasse is submitted to a multiple effect vinasse evaporation unit, under heating by evaporation vegetal vapor, producing: at least one vinasse vegetal vapor flow; a last effect vinasse vegetal vapor flow; a vegetal vapor condensate flow; and a concentrated vinasse flow; the wine, to be distillated, is pre-heated by indirect thermal exchange with at least one of the means defined by the last effect vinasse vegetal vapor flow and by an alcoholic vapor flow from a distillation stage, producing a vegetal vapor condensate flow and an alcoholic condensate flow; the excess of the vegetal vapor condensate flows which is not used in the process is sent, at least in part, to the cooling tower unit and, if it is still available, stored for posterior treatment.

2. The process, as set forth in claim 1, wherein the alcoholic condensate flow is returned to the top of the respective distillation stage from which it is extracted.

3. The process, as set forth in claim 1, wherein the clarified juice evaporation unit destined to sugar manufacture is provided with an outlet for releasing evaporation vegetal vapor in each of its at least four evaporative effects, the step of treating and purifying the extracted juice comprising: a first regenerative heating stage by injecting part of the condensate flow; a second heating stage using part of the evaporation vegetal vapor flow released in an evaporative effect of the evaporation unit; a third heating stage in which is injected part of the evaporation vegetal vapor released in an immediately previous evaporative effect; and a fourth heating stage in which is injected part of the evaporation vegetal vapor released in a first immediately previous evaporative effect of the evaporation unit.

4. The process, as set forth in claim 3, wherein the heating in the first evaporative effect of the evaporation unit is obtained by indirect thermal exchange between the exhausted steam of the energy generation unit and the clarified juice, generating the exhausted steam condensate flow, and a first vegetal vapor flow used to heat the subsequent effect and release a respective evaporation vegetal vapor flow for the process, and so on, until the last evaporative effect.

5. The process, as set forth in claim 3, wherein the step of treating and purifying the extracted juice further comprises submitting the heated juice to operations consisting of: "flash", flocculation with addition of electrolyte and decantation of impurities.

6. The process, as set forth in claim 1, wherein the step of treating and purifying the extracted juice destined to the ethanol manufacture comprises: a first regenerative heating stage by indirect thermal exchange with the clarified juice, a second injection stage of part of the condensate flow; a second regenerative heating stage by means of indirect thermal exchange with vegetal vapor condensates, and a final stage using part of the evaporation vegetal vapor flow released in an evaporative effect of the juice evaporation unit destined to the sugar manufacture.

7. The process, as set forth in claim 1, wherein the wine distillation, for obtaining hydrated ethanol (about 96° Gl), is carried out at least in two steps: in the first step, the pre-heated wine is put into boiling at a pressure equal or superior to the preferably atmospheric pressure, and in an indirect thermal exchange device, in the bottom of a multi-stage distillation column, producing, on the top of the column, alcoholic vapors containing a graduation between 40 and 60° GL (phlegm) and vinasse in the bottom, containing the wine solid constituents, water and a residual alcoholic content lower than about 0.05%, the heating being carried out by indirect thermal exchange with at least one of the means defined by part of the evaporation vegetal vapor flow, by part of the exhausted steam flow; and by a vinasse vegetal vapor flow, the alcoholic vapor obtained on the top of this first step (phlegm) being sent to the second distillation step, in which the phlegm, in the alcoholic vapor form, is fed into the first third of the column in an intermediate stage of the multiple stages, entering in contact with part of the re-circulated top condensate.

8. The process, as set forth in claim 1, wherein it further comprises the step of mixing filter cake, concentrated vinasse and combustion ashes of sugar cane straw and bagasse and, optionally, conventional chemical fertilizers, in order to compound an organo-mineral fertilizer.

9. The process, as set forth in claim 1, wherein the vinasse is submitted to a multiple effect vacuum evaporation unit, under a heating by alcoholic vapor effluent from the top of column B, producing at least one vinasse vegetal vapor flow, a alcoholic condensate flow (hydrated ethanol) and a concentrated vinasse flow.

10. The process, as set forth in claim 1, wherein the fermentation temperature is maintained between 30° C. and 32° C.

11. Process for the recovery of water and energy from the processing of sugar cane in ethanol production mills, using the sugar cane straw and bagasse as energy source for an electric energy and steam generation unit and comprising the steps of:
   a—submitting the sugar cane to a juice extraction operation with imbibition by vegetal vapor condensate;
   b—treating and purifying the extracted juice, using vegetal vapor condensate, pre-evaporation vegetal vapor and inputs and producing a clarified juice flow, a sludge flow and a vegetal vapor condensate flow;
   c—treating the sludge flow, producing a filter cake and a recovered juice flow which is returned to the step of treating and purifying the juice;
   d—submitting the clarified juice flow to a pre-evaporation unit, under heating by exhausted steam from the energy generation unit, producing: an exhausted steam condensate, to be at least in part returned to the energy generation unit; an evaporation vegetal vapor flow; and a pre-evaporated juice flow;
   e—cooling the pre-evaporated juice by indirect thermal exchange with at least one of the means defined by a flow of part of the extracted juice (mixed juice) and by a vegetal vapor condensate flow circulating by a cooling tower unit;
   f—fermenting the cooled must constituted by pre-evaporated juice, producing a wine flow, and distillating the wine to produce ethanol and vinasse, wherein:
      the extracted juice (mixed juice) is heated by indirect thermal exchange, before its physical-chemical treatment with at least one of the means defined by a pre-evaporated juice flow and vegetal vapor condensate flows recovered in the process;
      the extracted juice, submitted to the physical-chemical treatment, is heated to about 105° to 110° C., by indirect thermal exchange with the pre-evaporation vegetal vapor flow, transforming the latter in a vegetal vapor condensate flow;
      the step of distillating the wine is carried out with the indirect heating of the wine by at least one of the means defined: by part of the pre-evaporation vegetal vapor flow; by part of the exhausted steam flow; and by a vinasse vegetal vapor flow, producing an alcoholic vapor flow and at least one of the flows defined by vegetal vapor condensate and exhausted steam;
      the alcoholic vapor flow is cooled by indirect thermal exchange with at least one of the flows defined by fermented wine and by vegetal vapor condensate water of the cooling tower unit;
      the vinasse is submitted to a multiple effect vacuum vinasse evaporation unit, under heating by pre-evaporation vegetal vapor, producing: a vinasse vegetal vapor flow; a last effect vinasse vegetal vapor flow; a vegetal vapor condensate flow; and a concentrated vinasse flow;
      the wine, to be distillated, is pre-heated by indirect thermal exchange with at least one part of the flows defined by an alcoholic vapor flow of a distillation stage and by a last effect vinasse vegetal vapor flow, producing an alcoholic vapor condensate flow and a vinasse vegetal vapor condensate flow;

the excess of the vegetal vapor condensate flows which is not used in the process is sent, at least in part, to the cooling tower unit and, if it is still available, stored for posterior treatment.

12. The process, as set forth in claim 11, wherein the alcoholic condensate flow is re-circulated in the respective distillation stage from which it is extracted.

13. The process, as set forth in claim 11, wherein the step of treating and purifying the extracted juice further comprises submitting the heated juice to operations of: "flash", flocculation with addition of polyelectrolyte and decantation of impurities.

14. The process, as set forth in claim 11, wherein the wine distillation, for obtaining hydrated ethanol (at about 96° Gl), is carried out at least in two steps: in the first step, the pre-heated wine is put into boiling at a pressure equal or superior to the preferably atmospheric pressure, in an indirect thermal exchange device, in the bottom of a multi-stage distillation column, producing, on the top of the column, alcoholic vapors containing a graduation between 40 and 60° GL (phlegm) and vinasse in the bottom, containing the wine solid constituents, water and a residual alcoholic content lower than about 0.05%, the heating being carried out by indirect thermal exchange with at least one of the means defined by part of the pre-evaporation vegetal vapor flow and by a vinasse vegetal vapor flow, the alcoholic vapor obtained on the top of this first step (phlegm) being sent to the second distillation step, in which the phlegm, in the form of alcoholic vapor, is fed into the first third of the column in an intermediate stage of the multiple stages, entering in contact with part of the re-circulated top condensate.

15. The process, as set forth in claim 11, wherein it further comprises the step of mixing filter cake, concentrated vinasse and combustion ashes of sugar cane straw and bagasse and, optionally, conventional chemical fertilizers, in order to compound an organo-mineral fertilizer.

16. The process, as set forth in claim 11, wherein it further comprises the step of adjusting the amount of nutrients, the temperature, the fermentable sugar content, the pH, the yeast amount, and other parameters for controlling the must in fermentation, in order to obtain, after the alcoholic fermentation, a final alcoholic degree between 6 and 16° Gl.

17. The process, as set forth in claim 11, wherein the final alcoholic degree is >10≤16° Gl.

18. Process for the recovery of water and energy from the processing of sugar cane in sugar production mills, using the sugar cane straw and bagasse as energy source for an electric energy and steam generation unit and comprising the steps of:
a—submitting the sugar cane to a juice extraction operation with imbibition by vegetal vapor condensate;
b—treating and purifying the extracted juice, using vegetal vapor condensate, evaporation vegetal vapor and inputs and producing a clarified juice flow, a sludge flow and a vegetal vapor condensate flow;
c—treating the sludge flow, producing a filter cake and a recovered juice flow which is returned to the step of treating and purifying the juice;
d—submitting part of the clarified juice flow to a multiple effect vacuum evaporation unit, under heating by exhausted steam from the energy generation unit, producing: an exhausted steam condensate, to be returned to the energy generation unit; at least one evaporation vegetal vapor flow; a last effect vegetal vapor flow; a vegetal vapor condensate flow; and a syrup flow;
e—concentrating the syrup until the crystallization point of part of the sucrose contained therein under heating with at least part of the vegetal vapor flow produced in the evaporation unit, producing a crystallization vegetal vapor flow, a vegetal vapor condensate flow and a crystallized product flow (crystallized mass);
f—centrifuging the crystallized product, producing an end syrup (molasse) flow and a sugar flow to be dried and bagged, wherein: the extracted juice (mixed juice) is heated, at least in part, by indirect thermal exchange with at least one of the flows defined by last effect vegetal vapor of the evaporation unit and by the vegetal vapor from the step of concentrating the syrup for crystallization, transforming said vapor flows in vegetal vapor condensate flows; the excess of the vegetal vapor condensate flows, which is not used in the process, is sent, at least in part, to a cooling tower unit and, if it is still available, stored for posterior treatment.

19. The process, as set forth in claim 18, wherein the clarified juice evaporation unit presents at least four evaporative effects and is provided with an outlet for releasing evaporation vegetal vapor in each of its evaporative effects, the step of treating and purifying the extracted juice comprising: a first heating stage using the vegetal vapor condensate; a second heating stage using injection of part of the evaporation vegetal vapor flow released in a respective evaporative effect; a third heating stage in which is injected part of the evaporation vegetal vapor released in an immediately previous evaporative effect; and a fourth heating stage in which is injected part of the evaporation vegetal vapor released in a first evaporative effect of the evaporation unit.

20. The process, as set forth in claim 19, wherein the heating in the first evaporative effect of the evaporation unit is obtained by indirect thermal exchange between the exhausted steam from the energy generation unit and the clarified juice, generating the exhausted steam condensate flow and a first vegetal vapor flow used to heat the subsequent effect and release a respective evaporation vegetal vapor flow for the process, and so on, until the last evaporative effect.

21. The process, as set forth in claim 18, wherein the step of treating and purifying the extracted juice further comprises submitting the heated juice to operations of: "flash", flocculation with addition of polyelectrolyte and decantation of impurities.

22. The process, as set forth in claim 18, wherein the excess of vegetal vapor condensate water, which is generated in the process, is destined to irrigation.

23. The process, as set forth in claim 18, wherein the excess of vegetal vapor condensate water, which is generated in the process, is destined to an anaerobic biological treatment, with generation of biogas and, sequentially, to an aerobic treatment, and to a physical-chemical treatment, for domestic or industrial consumption.

24. The process, as set forth in claim 18, wherein the straw is brought up to the industry jointly with the sugar cane stems, is separated and separately processed before the extraction of the sugar cane juice and is sent to the electric energy and steam generation unit.

25. The process, as set forth in claim 24, wherein the straw is mixed with the bagasse effluent from the extraction and the mixture is sent to the electric energy and steam generation unit.

26. The process, as set forth in claim 18, wherein the vapor is generated in boilers of high pressure from 45 to 100 kgf/cm$^2$ of pressure.

27. The process, as set forth in claim 18, wherein the electric energy generation is effected in counterpressure turbogenerators and with condensation turbogenerator.

28. The process, as set forth in claim 27, wherein the counterpressure turbogenerator generates exhausted steam for the manufacturing process of sugar and or ethanol and organo-mineral fertilizer.

29. The process, as set forth in claim 27, wherein the condensation turbogenerator sends the whole condensate to a high-pressure boiler.

30. The process, as set forth in claim 28, wherein the whole electric energy necessary for the manufacturing process of the sugar and/or alcohol and organo-mineral fertilizer, as well as the excess of energy are generated from the burning of sugar cane bagasse and straw (fine straw).

31. The process, as set forth in claim 18, wherein the make up water of the electric energy and steam generation unit is obtained from the vegetal vapor condensate flows recovered from the process and submitted to a treatment for removal of salts and organic impurities.

32. The process, as set forth in claim 31, wherein the treatment of the make up water is effected by treatment through ion exchange resins in series with a reverse osmosis system.

* * * * *